United States Patent
Nakata et al.

(10) Patent No.: US 10,755,116 B2
(45) Date of Patent: Aug. 25, 2020

(54) IMAGE PROCESSING APPARATUS, IMAGING APPARATUS, AND DEVICE CONTROL SYSTEM

(71) Applicant: Ricoh Company, Ltd., Tokyo (JP)

(72) Inventors: Otoichi Nakata, Tokyo (JP); Shinichi Sumiyoshi, Tokyo (JP); Naoki Motohashi, Tokyo (JP); Sadao Takahashi, Tokyo (JP); Soichiro Yokota, Tokyo (JP); Toshifumi Yamaai, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 171 days.

(21) Appl. No.: 15/986,113

(22) Filed: May 22, 2018

(65) Prior Publication Data
US 2018/0268229 A1    Sep. 20, 2018

Related U.S. Application Data

(63) Continuation of application No. PCT/JP2016/079794, filed on Oct. 6, 2016.

(30) Foreign Application Priority Data

Nov. 27, 2015  (JP) ................................. 2015-232200

(51) Int. Cl.
G06K 9/00     (2006.01)
G08G 1/00     (2006.01)
(Continued)

(52) U.S. Cl.
CPC ......... G06K 9/00805 (2013.01); B60W 40/02 (2013.01); B62D 6/00 (2013.01);
(Continued)

(58) Field of Classification Search
CPC combination set(s) only.
See application file for complete search history.

(56) References Cited

U.S. PATENT DOCUMENTS 8,570,334 B2    10/2013    Sekiguchi et al.
8,605,153 B2    12/2013    Sasaki et al.
(Continued)

FOREIGN PATENT DOCUMENTS

EP     2767927 A2    8/2014
JP     2006-277666   10/2006
(Continued)

OTHER PUBLICATIONS

Obstacle Detection with 3D Camera using U-V-Disparity, Gao et al., 2011 7th International Workshop on Systems, Signal Processing and their Applications, p. 239-242 (Year: 2011).*

(Continued)

Primary Examiner — Janese Duley
(74) Attorney, Agent, or Firm — Xsensus LLP

(57) ABSTRACT

An image processing apparatus includes processing circuitry configured to obtain a range image having pixel values corresponding to a distance of an object in a plurality of captured images obtained by capturing the object on a road surface so as to extract pixel values from the range image, generate vertical direction distribution data indicating a frequency distribution of distance values in a vertical direction of the range image based on the extracted pixel values, calculate a height of the road surface in the range image before generation of the vertical direction distribution data is completed, and generate horizontal direction distribution data indicating a frequency distribution of distance values in a horizontal direction of the range image based on the extracted pixel values and the calculated height of the road surface.

7 Claims, 38 Drawing Sheets

(51) Int. Cl.

| | | |
|---|---|---|
| *B62D 6/00* | (2006.01) | |
| *G01C 3/06* | (2006.01) | |
| *G06T 1/00* | (2006.01) | |
| *B60W 40/02* | (2006.01) | |
| *G06T 7/593* | (2017.01) | |
| *H04N 13/128* | (2018.01) | |
| *G05D 1/02* | (2020.01) | |
| *G08G 1/16* | (2006.01) | |
| *H04N 13/00* | (2018.01) | |

(52) U.S. Cl.
CPC .............. *G01C 3/06* (2013.01); *G05D 1/0246* (2013.01); *G06T 1/00* (2013.01); *G06T 7/593* (2017.01); *G08G 1/00* (2013.01); *G08G 1/166* (2013.01); *H04N 13/128* (2018.05); *G05D 2201/0213* (2013.01); *G06K 9/00825* (2013.01); *G06T 2207/10028* (2013.01); *G06T 2207/30261* (2013.01); *H04N 2013/0081* (2013.01)

(56) References Cited

U.S. PATENT DOCUMENTS

| | | | |
|---|---|---|---|
| 8,654,196 B2 | 2/2014 | Yokota | |
| 8,950,872 B2 | 2/2015 | Hasegawa et al. | |
| 9,042,639 B2 * | 5/2015 | Franke | G06K 9/00201 382/154 |
| 9,330,320 B2 | 5/2016 | Takahashi et al. | |
| 9,420,151 B2 | 8/2016 | Yokota | |
| 9,443,294 B2 | 9/2016 | Sumiyoshi | |
| 9,637,118 B2 | 5/2017 | Yokota et al. | |
| 9,726,604 B2 | 8/2017 | Sekiguchi et al. | |
| 9,747,524 B2 | 8/2017 | Zhong et al. | |
| 9,794,543 B2 | 10/2017 | Sekiguchi et al. | |
| 9,819,927 B2 | 11/2017 | Takahashi et al. | |
| 9,886,649 B2 * | 2/2018 | Kakegawa | G08G 1/165 |
| 2012/0242835 A1 | 9/2012 | Li et al. | |
| 2013/0010106 A1 | 1/2013 | Yokota | |
| 2015/0049195 A1 | 2/2015 | Ishigaki et al. | |
| 2015/0332103 A1 | 11/2015 | Yokota et al. | |
| 2016/0014406 A1 | 1/2016 | Takahashi et al. | |
| 2016/0019429 A1 | 1/2016 | Ishigaki et al. | |
| 2017/0124725 A1 | 5/2017 | Sumiyoshi | |

FOREIGN PATENT DOCUMENTS

| | | |
|---|---|---|
| JP | 2013-225289 | 10/2013 |
| JP | 2014-225220 | 12/2014 |
| JP | 2015-075800 | 4/2015 |
| JP | 2017-083326 | 5/2017 |

OTHER PUBLICATIONS

Extended European Search Report dated Oct. 25, 2018 in European Patent application No. 16868275.5 citing document AX therein, 8 pages.

Gao, Y. et al. "U-V-Disparity based Obstacle Detection with 3D Camera and Steerable Filter", IEEE Intelligent Vehicles Symposium (IV), XP031998935, 2011, pp. 957-962.

International Search Report dated Nov. 22, 2016 in PCT/JP2016/079794 filed on Oct. 6, 2016.

Written Opinion dated Nov. 22, 2016 in PCT/JP2016/079794 filed on Oct. 6, 2016.

\* cited by examiner

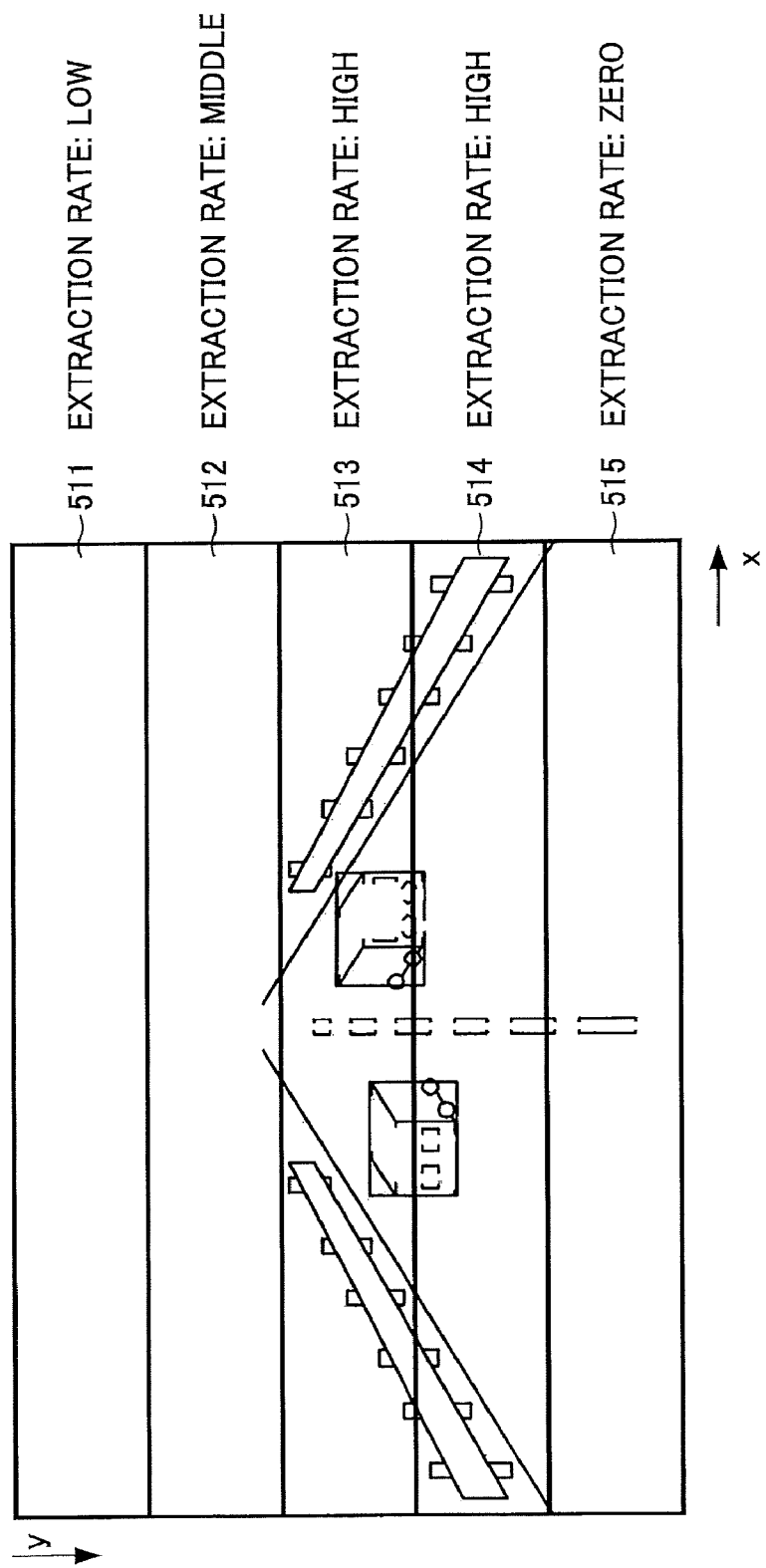

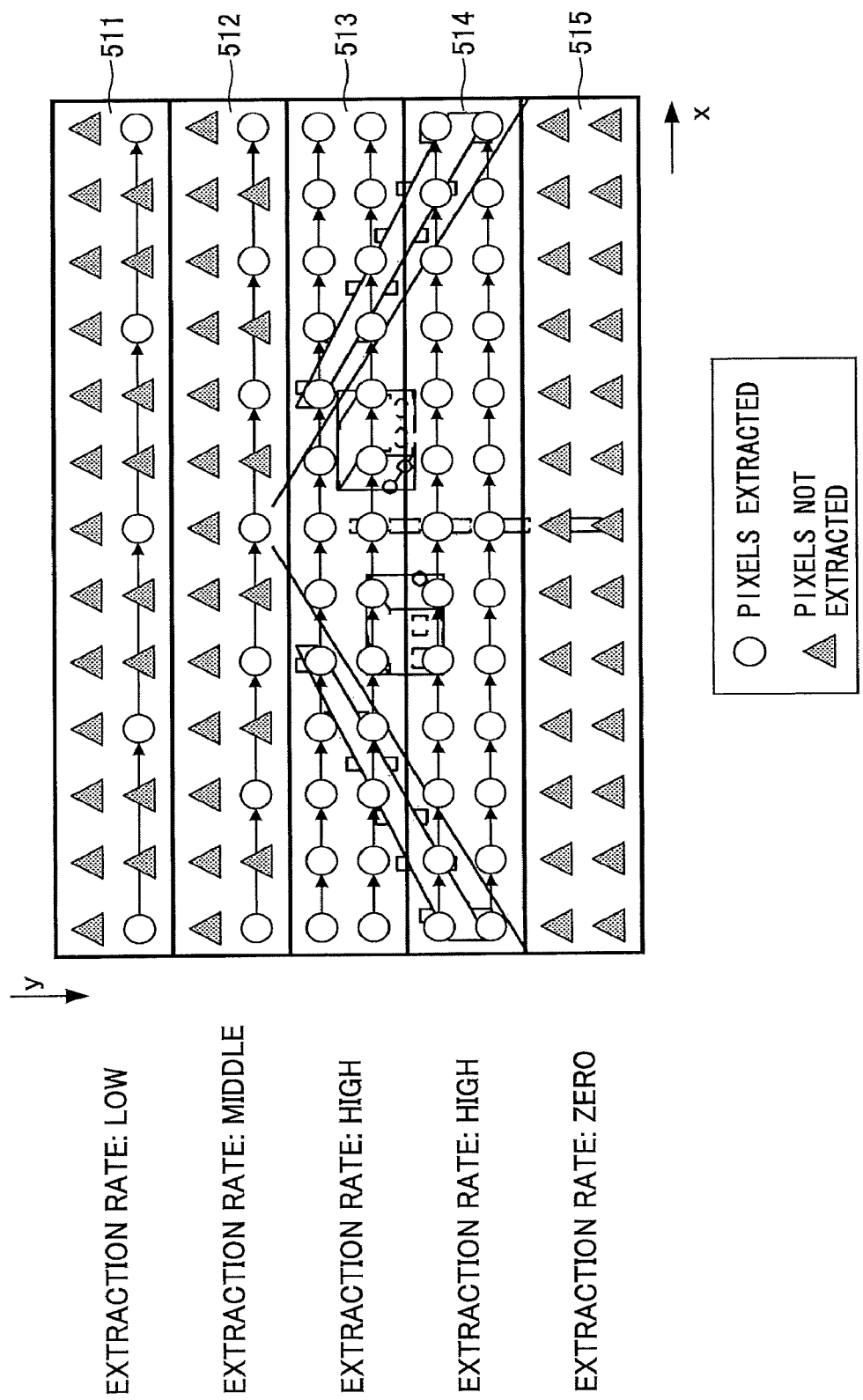

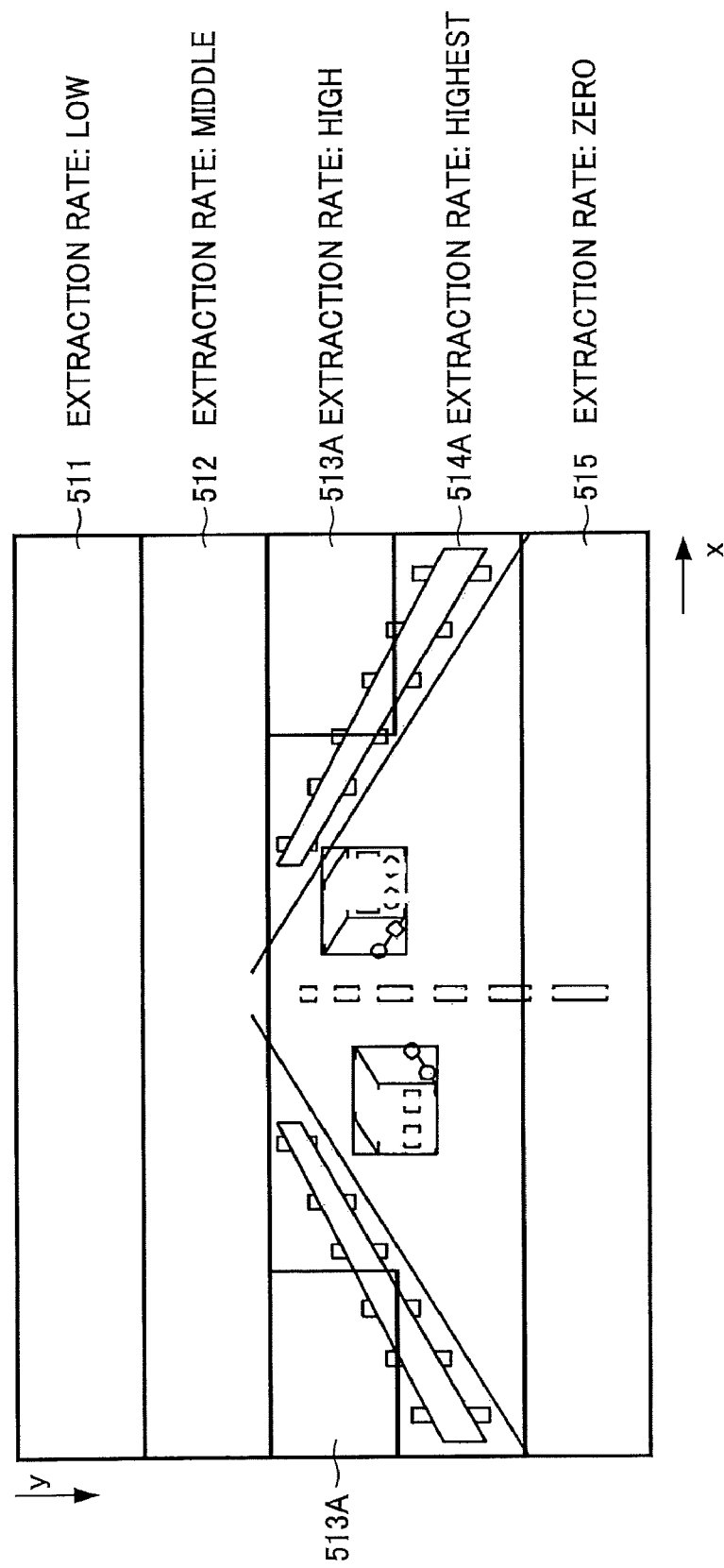

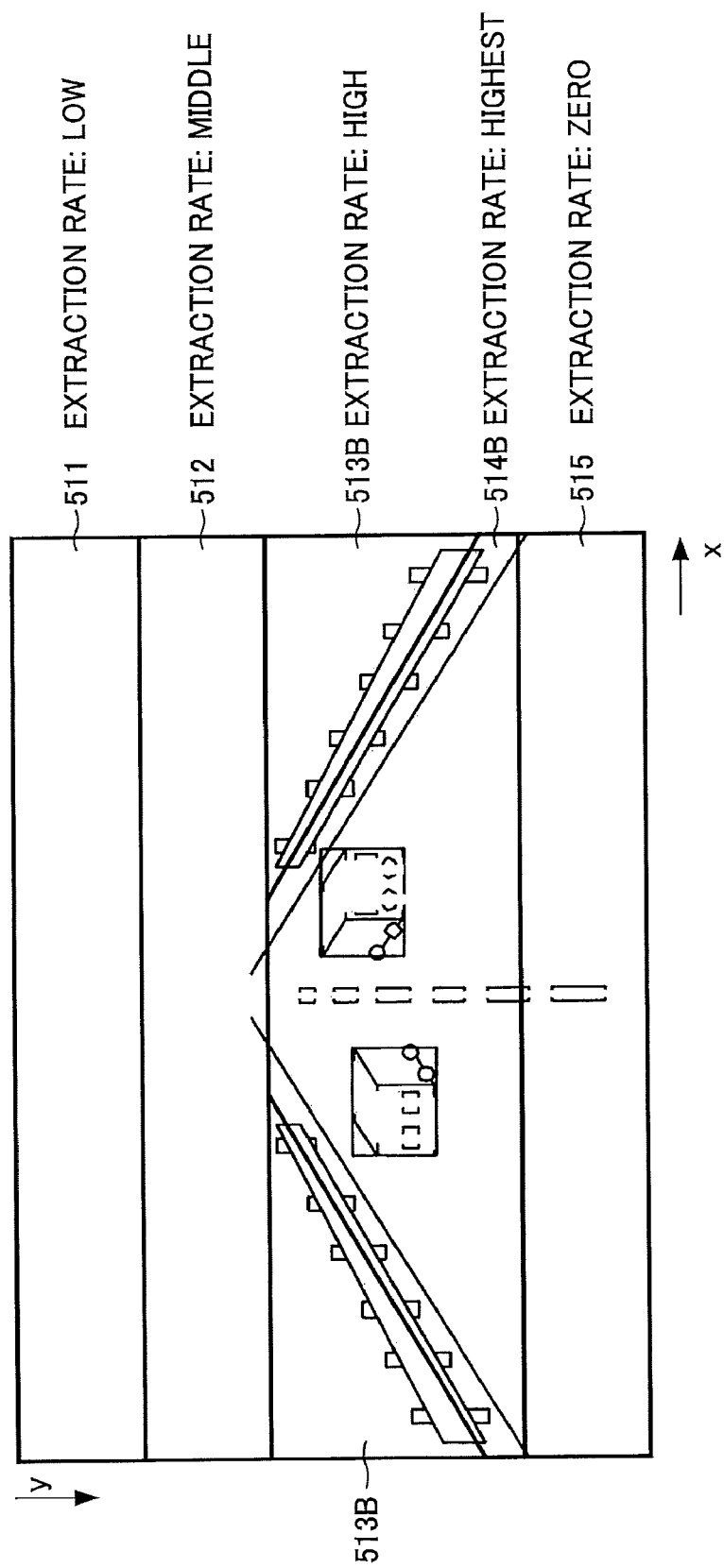

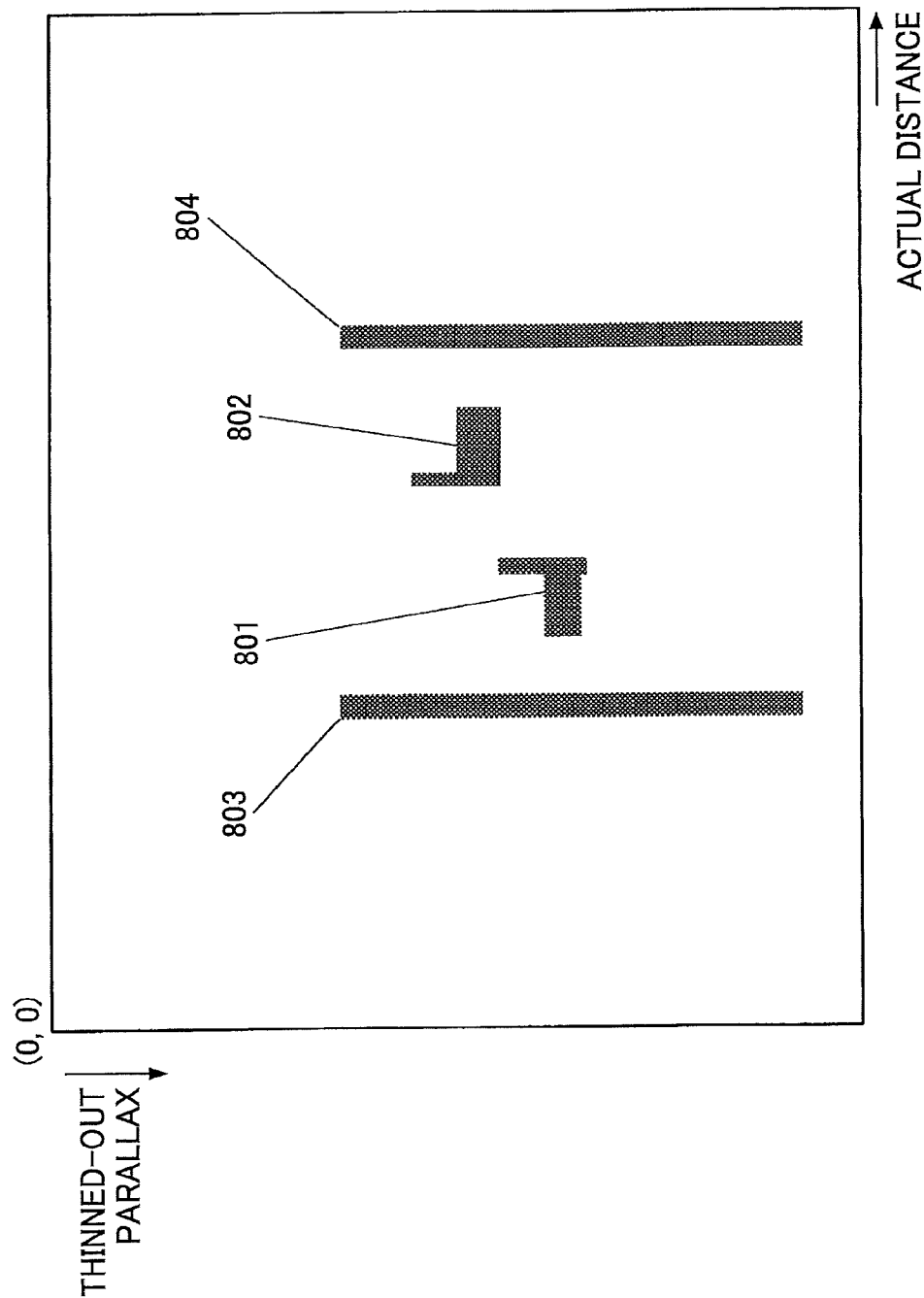

FIG.33

| OBJECT TYPE | WIDTH | HEIGHT | DEPTH | UNIT (mm) |
|---|---|---|---|---|
| MOTORBIKE, BICYCLE | <1100 | <2500 | >1000 | |
| PEDESTRIAN | <1100 | <2500 | <=1000 | |
| SMALL-SIZED VEHICLES | <1700 | <1700 | <10000 | |
| MEDIUM-SIZE VEHICLES | <1700 | <2500 | <10000 | |
| TRUCKS | <3500 | <3500 | <15000 | |
| OTHER | OBJECTS HAVING OTHER SIZES | | | |

IMAGE PROCESSING APPARATUS, IMAGING APPARATUS, AND DEVICE CONTROL SYSTEM

CROSS-REFERENCE TO RELATED APPLICATIONS

The present application is a continuation application of International Application No. PCT/JP2016/079794, filed on Oct. 6, 2016, which claims priority to Japanese Patent Application No. 2015-232200 filed on Nov. 27, 2015. The contents of these applications are incorporated herein by reference in their entirety.

BACKGROUND OF THE INVENTION

1. Field of the Invention

The disclosures herein generally relate to an image processing apparatus, an imaging apparatus, and a device control system.

2. Description of the Related Art

Conventionally, body structures of automotive vehicles have been developed for the purposes of promoting the safety and protection of pedestrians and vehicle occupants when collisions with other vehicles or pedestrians occur. However, in recent years, with the advancement of information processing technologies and image processing technologies, technologies that enable fast detection of pedestrians and vehicles have been developed. Automotive vehicles that use these technologies to automatically activate brakes before collisions so as to prevent the vehicles from colliding with other vehicles or pedestrians have already come on the market.

In order for a vehicle to automatically activate brakes, distances from the vehicle to other vehicles and pedestrians are required to be measured. For this purpose, measurements using images obtained by a stereo camera have been put to practical use.

For such measurements using images obtained by a stereo camera, a technique for identifying objects such as people and other vehicles by performing image processing as described below is known (see Patent Document 1, for example).

First, a V-disparity image is generated from a plurality of images obtained by a stereo camera. One axis of the V-disparity image represents coordinates in the vertical direction, the other axis of the V-disparity represents disparity, and pixel values represent the frequency of disparity values. Next, based on the generated V-disparity image, a road surface is detected. By using the detected road surface, a U-disparity image is generated. A vertical axis of the U-disparity image represents coordinates in the horizontal direction and a horizontal axis of the U-disparity image represents disparity, and pixel values represent the frequency of disparity values of an object located at a position higher than the road surface. Based on the generated U-disparity image, objects such as people and other vehicles are identified.

However, the conventional technique has a problem in that image processing takes time to identify an object by using a range image indicating distance information, such as a parallax image obtained by a stereo camera.

RELATED-ART DOCUMENTS

Patent Documents

[Patent Document 1] Japanese Unexamined Patent Publication No. 2015-075800

It is an object of one aspect of the present invention to provide a technique that enables fast image processing for detecting an object by using a range image.

SUMMARY OF THE INVENTION

According to an embodiment, an image processing apparatus includes an extracting unit configured to obtain a range image having pixel values corresponding to a distance of an object in a plurality of captured images obtained by capturing the object on a road surface so as to extract pixel values from the range image, a first generating unit configured to generate vertical direction distribution data indicating a frequency distribution of distance values in a vertical direction of the range image based on the extracted pixel values, a calculating unit configured to calculate a height of the road surface in the range image before generation of the vertical direction distribution data of the range image is completed, and a second generating unit configured to generate horizontal direction distribution data indicating a frequency distribution of distance values in a horizontal direction of the range image based on the extracted pixel values and the calculated height of the road surface.

BRIEF DESCRIPTION OF THE DRAWINGS

FIG. 9 is a diagram for explaining a process of dividing parallax image data into a plurality of areas;

FIG. 10 is a diagram for explaining a process of extracting parallax pixel data;

FIG. 11A is a diagram for explaining another process of dividing parallax image data into a plurality of areas;

FIG. 11B is a diagram for explaining another process of dividing parallax image data into a plurality of areas;

FIG. 26 is a diagram illustrating a real U map corresponding to the U map;

FIG. 33 is a diagram illustrating an example of table data for object type classification.

DESCRIPTION OF THE PREFERRED EMBODIMENTS

In the following, embodiments of the present invention will be described with reference to the accompanying drawings.

According to an embodiment, it is possible to provide a technique that enables fast image processing for detecting an object by using a range image.

In the following, a moving object device control system including an image processing apparatus according to an embodiment will be described.

<Configuration of in-Vehicle Device Control System>

Figure 1:
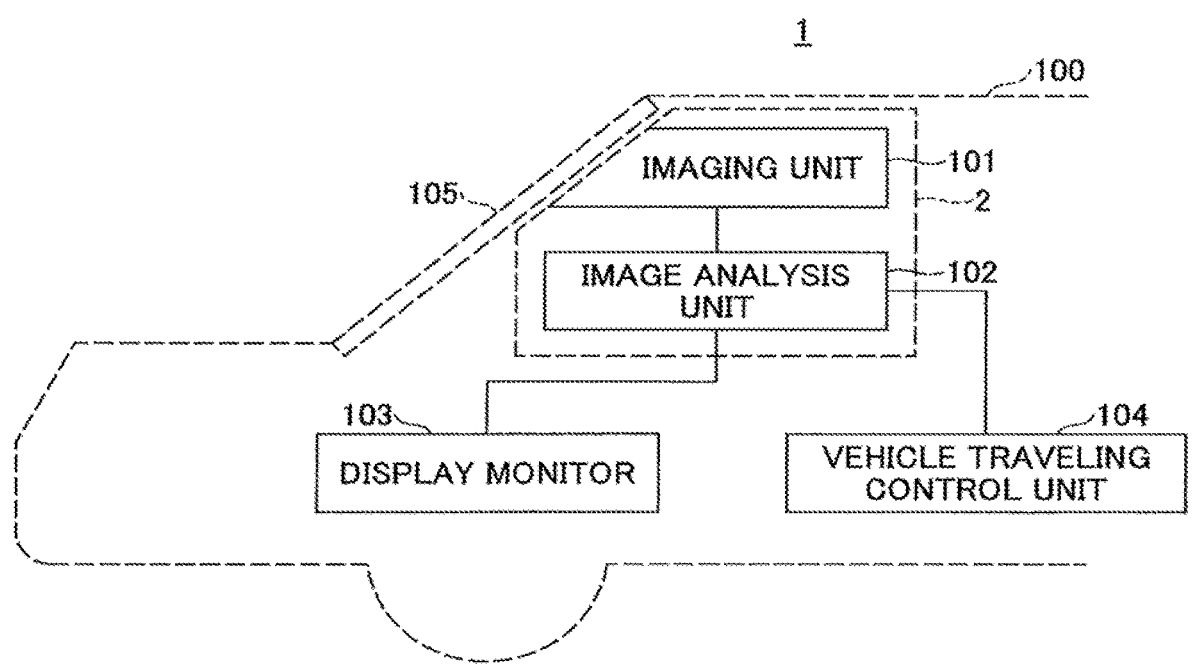
FIG. 1 is a diagram illustrating a configuration of an in-vehicle device control system according to an embodiment.

FIG. 1 is a diagram illustrating a configuration of an in-vehicle device control system as an example of a moving object device control system according to an embodiment.

The in-vehicle device control system 1 is mounted on a vehicle 100 that is a moving object. The in-vehicle device control system 1 includes an imaging unit 101, an image analysis unit 102, a display monitor 103, and a vehicle traveling control unit 104. The in-vehicle device control system 1 detects relative height information (information indicating a relative inclination condition) of a road surface ahead of the vehicle based on an image obtained by capturing an imaging area ahead of the moving object by the imaging unit 101. The in-vehicle device control system detects a three-dimensional profile of the road surface ahead of the vehicle based on the detected relative height information, and controls the moving object and various in-vehicle devices by using the detected three-dimensional profile. The control of the moving object includes sending warning notification, controlling a steering wheel of the vehicle 100, and controlling brakes of the vehicle 100.

For example, the imaging unit 101 is disposed near a rear-view mirror (not illustrated) on a windshield 105 of the vehicle 100. Various types of data including captured image data obtained by the imaging unit 101 are input into the image analysis unit 102 used as an image processing unit.

The image analysis unit 102 analyzes the data sent from the imaging unit 101. The image analysis unit 102 detects a relative height at each point on the road surface in the travelling direction with respect to the road surface portion immediately below the vehicle 100, and detects a three-dimensional profile of the road surface ahead of the vehicle. The image analysis unit 102 also detects other vehicles, pedestrians, and obstacles ahead of the vehicle.

The analysis result output from the image analysis unit 102 is sent to the display monitor 103 and the vehicle traveling control unit 104. The display monitor 103 displays the image captured by the imaging unit 101 and also displays the analysis result. The vehicle traveling control unit 104 performs travelling support control based on the analysis result output from the image analysis unit 102, including sending warning notification to a driver of the vehicle 100 and controlling the steering wheel and the brakes of the vehicle.

<Configuration of Imaging Unit 101 and Image Analysis Unit 102>

Figure 2:
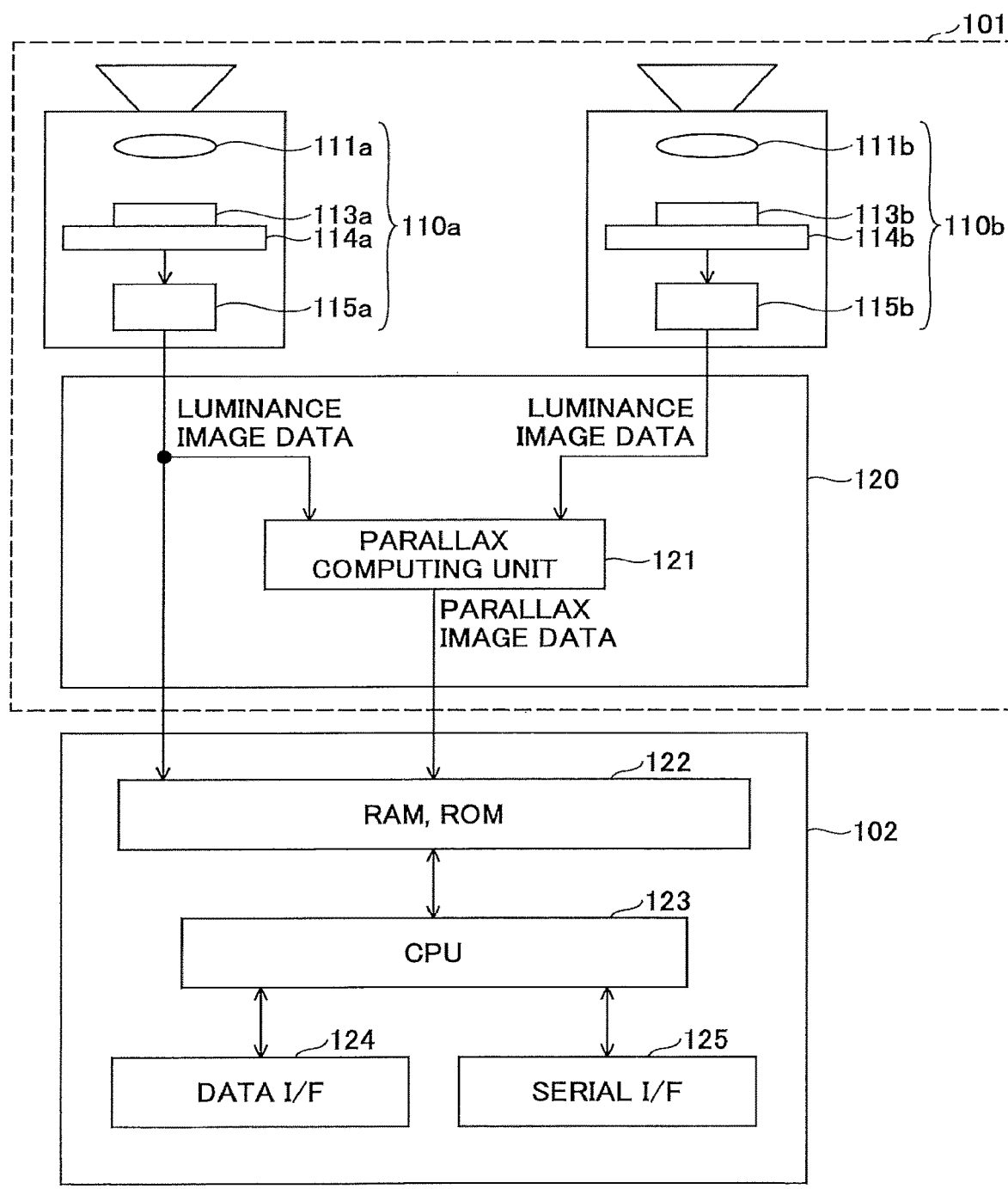
FIG. 2 is a diagram illustrating a configuration of an imaging unit and an image analysis unit.

FIG. 2 is a diagram illustrating a configuration of the imaging unit 101 and the image analysis unit 102.

The imaging unit 101 includes a stereo camera equipped with two imaging units 110a and 110b serving as image capturing units. The two imaging units 110a and 110b are identical. The imaging units 110a and 110b include imaging lenses 111a and 111b, image sensors 113a and 113b in which photodetectors are two-dimensionally arranged, sensor boards 114a and 114b on which the image sensors 113a and 113b are mounted, and signal processors 115a and 115b, respectively. The signal processors 115a and 115b each convert an analog electrical signal (an electrical signal indicating the amount of light received by each of the photodetectors on the image sensors 113a and 113b), which has been output from the sensor board 114a and 114b, into a digital electrical signal so as to generate and output captured image data. The imaging unit 101 outputs luminance image data and parallax image data.

Also, the imaging unit 101 includes processing hardware 120 implemented by a field-programmable gate array (FPGA) or the like. The processing hardware 120 includes a parallax computing unit 121 serving as a parallax image information generating unit configured to compute a parallax value of a corresponding image portion between the captured images obtained by the imaging units 110a and 110b, in order to obtain a parallax image from the luminance image data output from the imaging units 110a and 110b.

One of the captured images obtained by the imaging units 110a and 110b is regarded as a reference image and the other captured image is regarded as a comparison image. As used herein, the parallax value refers to an amount of positional deviation between an image portion of the reference image and an image portion of the comparison image, and both the image portions correspond to a same point in the imaging area. By using the principle of triangulation, a distance to the same point corresponding to the image portions in the imaging area may be calculated based on the parallax value.

Figure 3:
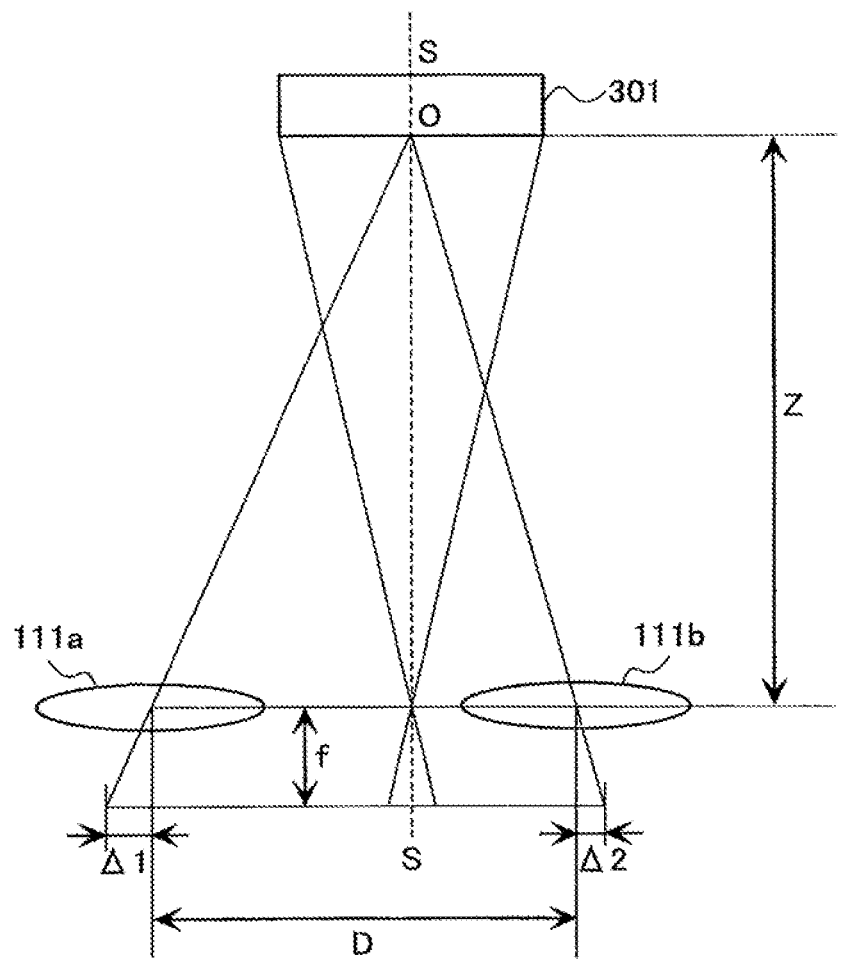
FIG. 3 is a diagram for explaining a principle for calculating a distance based on a parallax value.

FIG. 3 is a diagram for explaining a method for calculating a distance based on a parallax value by using the principle of triangulation. In FIG. 3, f denotes a focal distance of each of the imaging lenses 111a and 111b, and D denotes a distance between the optical axes of the imaging lenses 111a and 111b. Also, Z denotes a distance from the imaging lenses 111a and 111b to a subject 301 (namely, a distance in a direction parallel to the optical axes). In FIG. 3, a distance of an image formation position of a left image with respect to a point O on the subject 301 from an image formation center thereof is set to $\Delta 1$, and a distance of an image formation position of a right image with respect to the point O on the subject 301 from an image formation center thereof is set to $\Delta 2$. A parallax value d in this example is represented by $d=\Delta 1+\Delta 2$.

Referring back to FIG. 2, the image analysis unit 102 includes an image processing board and the like. Also, the image analysis unit 102 includes a memory unit 122, such as RAM and ROM, that stores the luminance image data and the parallax image data output from the imaging unit 101. The image analysis unit 102 further includes a central processing unit (CPU) 123 configured to execute a computer program for performing an object recognition process and parallax calculation control, and includes a data interface (I/F) 124 and a serial interface (I/F) 125.

The FPGA implementing the processing hardware 120 is configured to perform real-time processing of image data, such as gamma correction and distortion correction (collimation of right and left captured images), and also perform parallax computation by block matching so as to generate parallax image information and write the parallax image information into the RAM of the IMAGE analysis unit 102. The CPU of the image analysis unit 102 is configured to perform control of image sensor controllers of the imaging units 110a and 110b and overall control of the image processing board. Further, the CPU is configured to perform processing using the luminance image data and the parallax image data stored in the RMA by executing programs for detecting a three-dimensional profile of a road surface and detecting an object such as a guardrail, and to output the processed results to an external device via the data I/F 124 or the serial I/F 125. Further, when the above-described processing is performed, vehicle performance information such as a vehicle speed, an acceleration rate (mainly, a forward/backward acceleration rate), a steering angle, and a yaw rate of the vehicle 100 may be input by means of the data I/F 124, such that the vehicle performance information may be used as parameters of the processing. The data output to the external device is used as input data for controlling various devices of the vehicle 100 (such as brake control, vehicle speed control, and warning control).

Moreover, the imaging unit 101 and the image analysis unit 102 may be integrated as an imaging apparatus 2.

<Object Detection Process>

Figure 4:
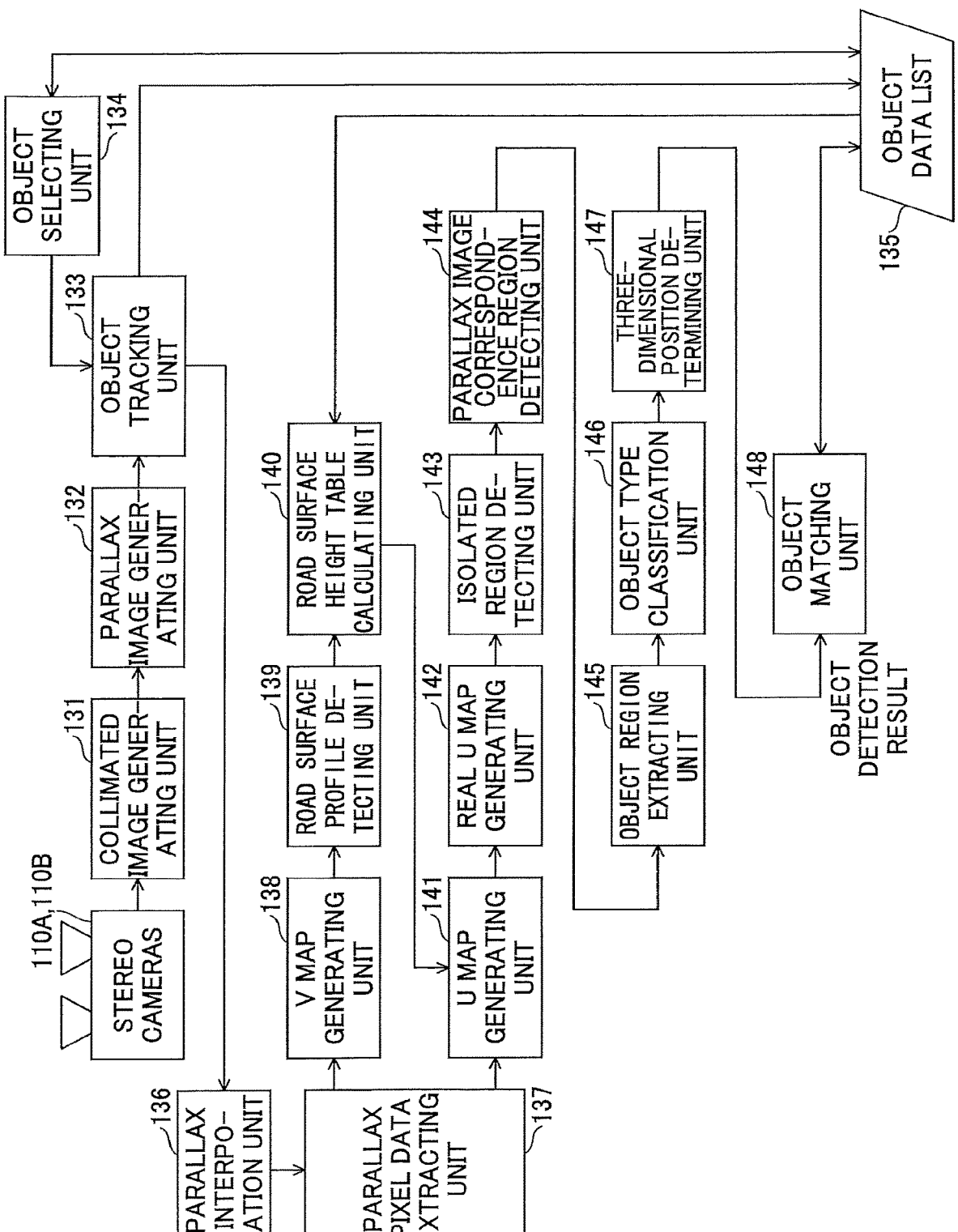
FIG. 4 is a functional block diagram illustrating an object detection process according to an embodiment.

FIG. 4 is a block diagram illustrating a functional configuration of an object detection process. This functional block is implemented by the processing hardware 120 and the image analysis unit 102 illustrated in FIG. 2. In the following, the object detection process according to an embodiment will be described.

The two imaging units 110a and 110b, constituting the stereo camera, output luminance image data. When the imaging units 110a and 110b capture color images, RGB signals of the color images are converted into luminance signals (Y) by the following formula (1).

$$Y=0.3R+0.59G+0.11B \quad (1)$$

<<Collimated Image Generating Process>>

First, a collimated image generating unit 131 performs a collimated image generating process by using luminance image data. In the collimated image generating process, based on optical distortion of the imaging units 110a and 110b and a relative positional relationship between the imaging units 110a and 110b, luminance image data (a reference image and a comparison image) output from the imaging units 110a and 110b are converted into an ideal collimated stereo image that is obtained when two pinhole cameras are placed in parallel with each other. To be more specific, an amount of distortion for each pixel is calculated by using polynomials $\Delta x=f(x, y)$ and $\Delta y=g(x, y)$. Based on the calculated result, each of the pixels of the luminance image data (the reference image and the comparison image) output from the imaging units 110a and 110b are converted. The polynomials may be based on a fourth-degree polynomial with respect to x (a position in the horizontal direction of the image) and y (a position in the vertical direction of the image). Also, instead of using the polynomials to calculate the amount of distortion for each pixel, a table that preliminarily sets the amount of distortion for each pixel may be used.

<<Parallax Image Generating Process>>

After the collimated image generating process is performed, a parallax image generating unit 132, implemented by the parallax computing unit 121 (FIG. 2), performs a parallax image generating process such that parallax image data is generated. In the parallax image generating process, luminance image data of the imaging unit 110a, which is one of the imaging units 110a and 110b, is used as reference image data, and luminance image data of the other imaging unit 110b is used as comparison image data. Parallax values between the reference image data and the comparison image data are calculated. As a result, parallax image data is generated and output. The parallax image data indicates a parallax image having pixel values corresponding parallax values calculated for each of pixels of the reference image data.

To be more specific, the parallax image generating unit 132 defines a block of a plurality of pixels (16×1 pixels, for example) having a pixel of interest at the center of the block, with respect to one line of the reference image data. Further, on the same line of the reference image data, by shifting a block having the same size as the defined block of the reference image data by one pixel in the horizontal line direction (x-axis direction), the parallax image generating unit 132 calculates a correlation value indicating a correlation between a feature amount indicating a feature of the pixel values of the defined block of the reference image data and a feature amount indicating a feature of the pixel values of each block of the comparison image data. Further, based on the calculated correlation values, the parallax image generating unit 132 performs a matching process for selecting, from the blocks of the comparison image data, the most correlated block with the block of the reference image data. Subsequently, the parallax image generating unit 132 calculates, as a parallax value d, an amount of positional deviation between the pixel of interest of the block of the reference image data and the corresponding pixel of the comparison image data selected by the matching process. By performing the above-described process of calculating the parallax value d repeatedly for the entire area or a particular area of the reference image data, the parallax image data can be obtained. In the present embodiment, a parallax value is equivalent to a distance value. Although a parallax image is described as an example of a range image, the present invention is not limited to this example. For example, distance information from millimeter-wave radar or laser radar may be combined with a parallax image captured by a stereo camera so as to generate a range image.

For example, pixel values (luminance values) included in the block may be used as a feature amount of a block used by the matching process. As a correlation value, the sum of absolute values of differences between pixel values (luminance values) included in a block of reference image data and corresponding pixel values (luminance values) of each block of comparison image data may be used. In this case, a block with the smallest sum of the absolute values of the differences is determined as the most correlated block.

For example, in a case where the parallax image generating unit 132 performs the matching process by hardware processing, any one of methods such as sum of squared difference (SSD), zero-mean sum of squared difference (ZSSD), sum of absolute difference (SAD), zero-mean sum of absolute difference (ZSAD), and normalized cross-correlation (NCC) may be used. Further, only the parallax value per pixel may be calculated by the matching process. If a parallax value at a sub-pixel level is required, an estimated value is required to be used. As an estimation method, an isometric straight line fitting process or a quadratic curve fitting process may be used, for example.

<<Object Tracking>>

Next, an object tracking unit 133 performs a process of tracking an object detected by an image detection process of the previously captured frames.

In the present embodiment, an object data list 135 indicating information related to objects previously detected by the image detection process is stored. The object data list 135 includes the latest data (the latest position, a size, a distance, a relative velocity, and parallax information) of a detected object, object prediction data (indicating a predicted position of the object in the following captured frame), object feature amounts used by the object tracking unit 133 and an object matching unit 148 described later, the number of detected/undetected frames indicating the number of frames in which the object has been detected or has not been detected continuously, and the tracking probability (reliability flag: S) indicating whether the object is a tracking target.

An object selecting unit 134 determines whether an object included in the object data list 135 is tracked based on the probability of presence of the object and the position of the object. To be more specific, a prediction range in the parallax image data where the presence of the object is predicted is set based on the object prediction data included in the object data list 135; and, a height of the object in the prediction range is identified, a width of the object is identified based on the identified height of the object by referring to the object feature amounts included in the object data list 135, and a position of the object in the horizontal direction of the parallax image data is estimated based on the identified width of the object. When the estimated position of the object in the horizontal direction of the parallax image data satisfies a predetermined tracking target requirement, the object selecting unit 134 determines that the object is to be tracked, and outputs the determination result to the object tracking unit 133. For example, the tracking target requirement is satisfied when the probability of the object being present in the image is high or the position of the object is suitable to be tracked based on the estimated position of the object in the horizontal direction. Further, the data included in the object data list 135 is updated based on the determination result by the object selecting unit 134.

The object tracking unit 133 performs a process of tracking the object selected to be tracked by the object selecting unit 134. In order to perform the tracking process, the object tracking unit 133 receives the parallax image data generated by the parallax image generating unit 132 and the object prediction data and the object feature amounts determined by the object selecting unit 134.

<<Parallax Image Interpolation Process>>

After the parallax image generating process is performed, a parallax interpolation unit 136 implemented by the image analysis unit 102 performs a parallax image interpolation process.

The parallax value d is a value indicating an amount of deviation in the horizontal direction. Thus, it is difficult to calculate a parallax value of a horizontal edge portion of a captured image or a portion where a luminance change is small. As a result, it becomes difficult to identify a preceding vehicle as a single object. In light of this, the parallax interpolation unit 136 interpolates pixels between two points in the parallax image when predetermined conditions are met, for example. The predetermined conditions are met when a real distance between the two points in the parallax image is less than a predetermined distance and no other parallax value exists between the two points.

First Embodiment

<<Process of Generating Frequency Distribution Image of Parallax Values>>

Next, a frequency distribution image of parallax values is generated based on the parallax image data. The following process is performed.

A road surface profile detecting unit 139 and a road surface height table calculating unit 140 calculate a height of the road surface before generation of a V map of the parallax image is completed. For example, a height of the road surface is preliminarily calculated based on a V map (an example of vertical direction distribution data) indicating a frequency distribution of parallax values in the vertical direction of a parallax image generated from previously obtained parallax image data (for example, a parallax image frame obtained at the last time). A detailed example of a process of calculating a height of a road surface based on a V map will be described below as a process of detecting a road surface profile and calculating a road surface height table. In the present embodiment, the vertical direction of a parallax image does not refer to the exact vertical direction, but to the y-axis direction of a luminance image obtained by capturing an image ahead of a vehicle in order to generate the parallax image.

A parallax pixel data extracting unit 137 obtains the parallax image data and extracts pixel values (parallax pixel data) from a predetermined area of the parallax image at a predetermined extraction rate. For example, the parallax pixel data extracting unit 137 extracts pixel values from a first area, which is at least one of an area indicating the road surface in the parallax image and an area having a larger parallax value of an object in the parallax image (namely, an area nearer to the vehicle). Also, the parallax pixel data extracting unit 137 extracts pixel values from a second area at a lower extraction rate than the first extraction rate. A process of extracting parallax pixel data will be described later in detail.

A V map generating unit 138 generates a V map based on the pixel values extracted by the parallax pixel data extracting unit 137. A process of generating a V map will be described later in detail.

A U map generating unit 141 generates a U map (an example of horizontal direction distribution data) indicating a frequency distribution of parallax values in the horizontal direction based on the pixel values extracted by the parallax pixel data extracting unit 137 and the height of the road surface calculated by the road surface height table calculating unit 140. A process of generating a U map will be described later in detail.

A real U map generating unit 142 generates a real U map (another example of horizontal direction distribution data) indicating a frequency distribution of parallax values based on the U map generated by the U map generating unit 141. A process of generating a real U map will be described later in detail. Also, the real U map generating unit 142 may be configured to generate a real U map based on the pixel values extracted by the parallax pixel data extracting unit 137 and the height of the road surface calculated by the road surface height table calculating unit 140, rather than based on the U map. In this case, the U map and the real U map may be generated simultaneously.

Figure 5:
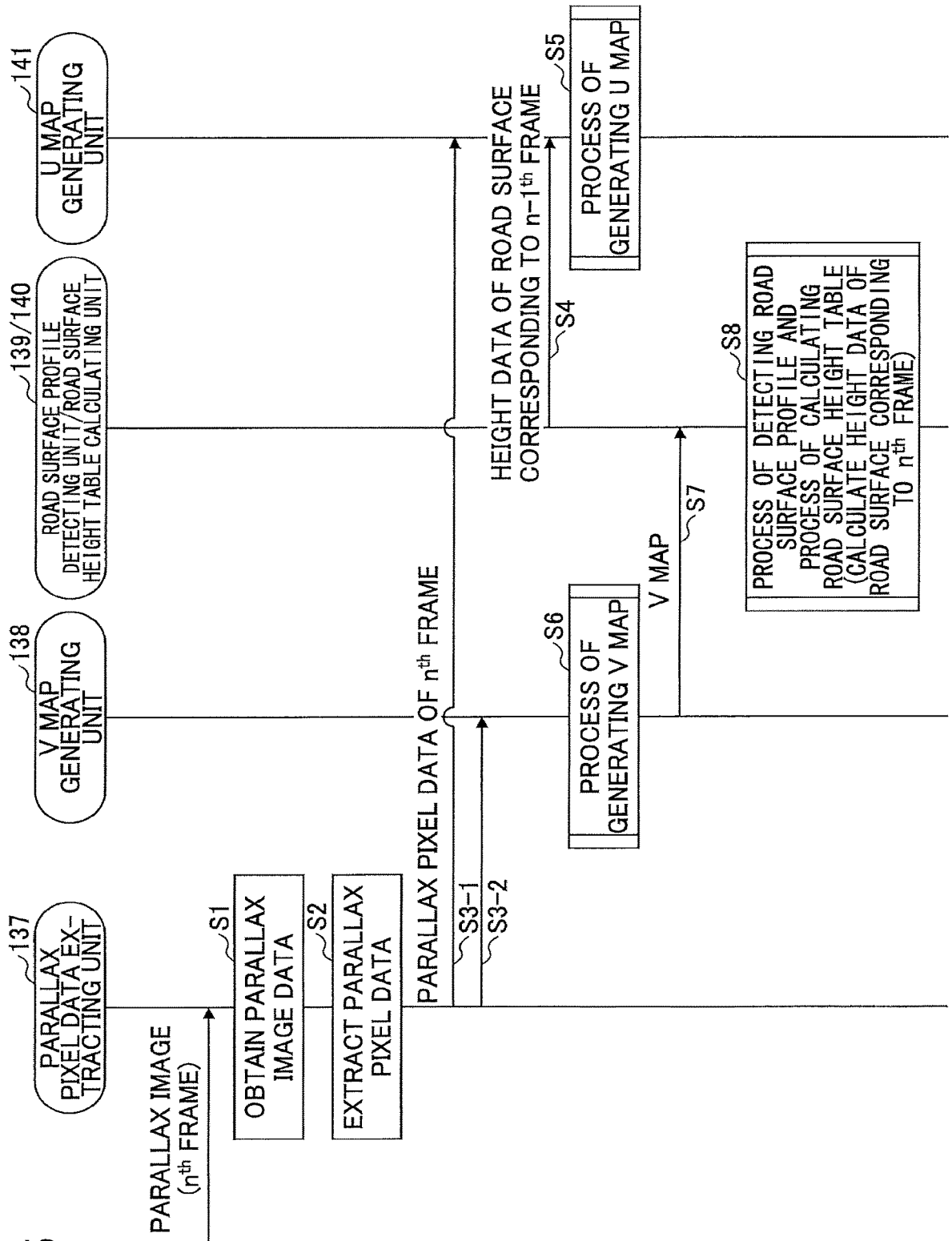
FIG. 5 is a sequence diagram illustrating an example of a process of generating a frequency distribution image of parallax values according to a first embodiment.

Next, referring to FIG. 5, the process of generating a frequency distribution image of parallax values will be described in detail. FIG. 5 is a sequence diagram illustrating an example of the process of generating a frequency distribution image of parallax values according to the first embodiment.

The parallax pixel data extracting unit 137 obtains the $n^{th}$ frame parallax image (step S1).

The parallax pixel data extracting unit 137 extracts pixel values (parallax pixel data) from the $n^{th}$ frame parallax image (step S2).

The parallax pixel data extracting unit 137 outputs the extracted pixel values to both the V map generating unit 138 and the U map generating unit 141 (steps S3-1 and S3-2).

The U map generating unit 141 obtains height data of a road surface corresponding to a frame obtained at the last time (n−$1^{th}$ frame) from the road surface height table calculating unit 140 (step S4).

The U map generating unit 141 performs a process of generating a U map based on the pixel values extracted by the parallax pixel data extracting unit 137 and the height of the road surface calculated by the road surface height table calculating unit 140 (step S5).

Simultaneously with steps S4 and S5 performed by the U map generating unit 141, the V map generating unit 138 performs a process of generating a V map based on the pixel values extracted by the parallax pixel data extracting unit 137 (step S6).

The road surface profile detecting unit 139 and the road surface height table calculating unit 140 obtains the V map corresponding to the $N^{th}$ frame generated in step S6 (step S7). Based on the V map, the road surface profile detecting unit 139 and the road surface height table calculating unit 140 calculate a height of the road surface corresponding to the $N^{th}$ frame (step S8).

Figure 6:
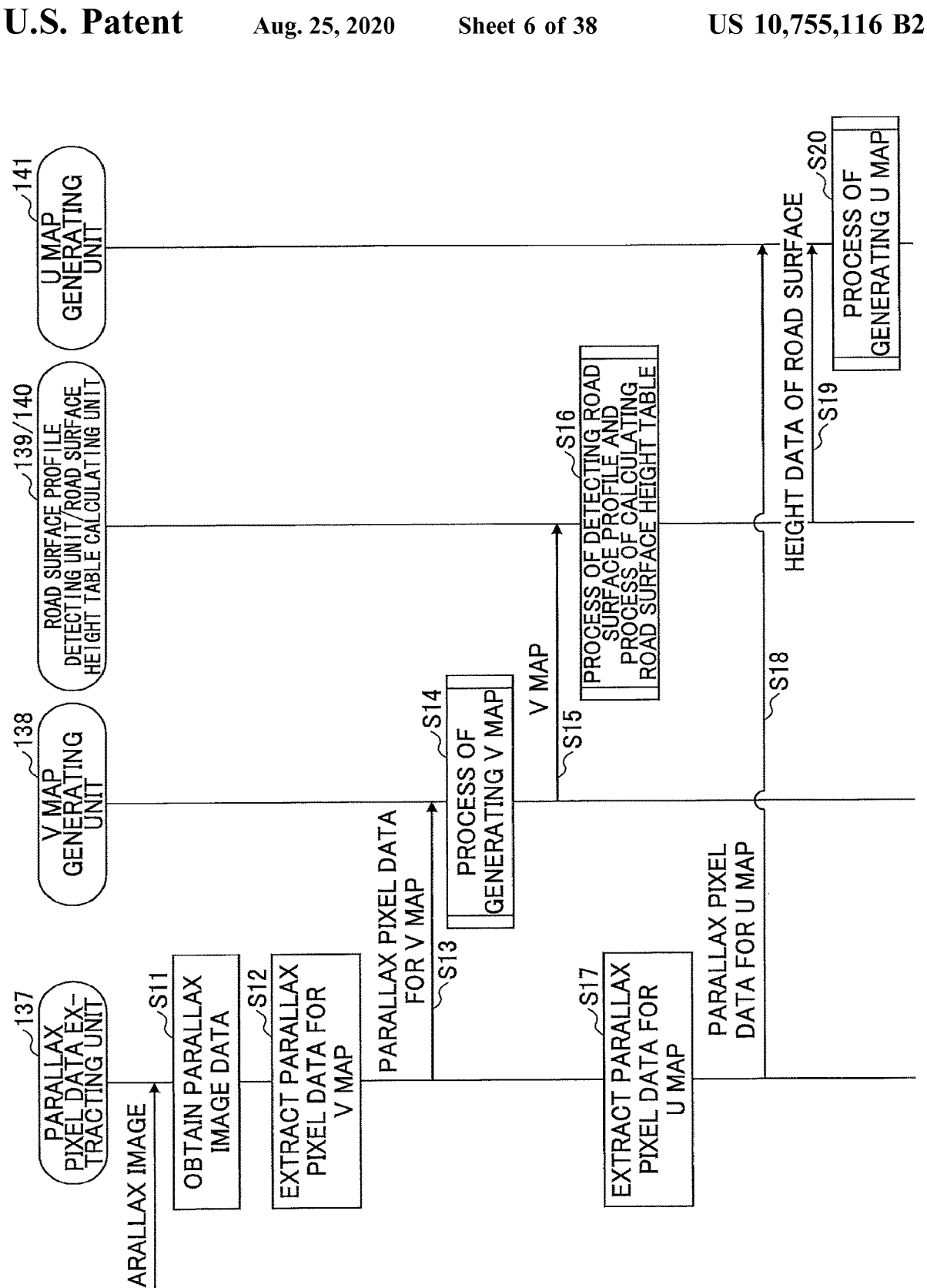
FIG. 6 is a sequence diagram illustrating a conventional process of generating a frequency distribution image of parallax values.

Next, referring to FIG. 6, in order to describe an effect of the above-described embodiment, a conventional process of generating a frequency distribution image of parallax values will be described. FIG. 6 is a sequence diagram illustrating the conventional process of generating a frequency distribution image of parallax values.

The parallax pixel data extracting unit 137 obtains parallax image data (step S11).

The parallax pixel data extracting unit 137 extracts pixel values (parallax pixel data) for a V map from the parallax image data (step S12).

The parallax pixel data extracting unit 137 outputs the extracted pixel values to the V map generating unit 138 (step S13).

The V map generating unit 138 performs a process for generating the V map based on the pixel values extracted by the parallax pixel data extracting unit 137 (step S14).

The road surface profile detecting unit 139 and the road surface height table calculating unit 140 obtain the generated V map (step S15). The road surface profile detecting unit 139 and the road surface height table calculating unit 140 calculate a height of a road surface based on the generated V map (step S16).

The parallax pixel data extracting unit 137 extracts pixel values for a U map from the parallax image data (step S17).

The parallax pixel data extracting unit 137 outputs the extracted pixel values to the U map generating unit 141 (step S18).

The U map generating unit 141 obtains the height data of the road surface from the road surface height table calculating unit 140 (step S19).

The U map generating unit 141 performs a process for generating the U map based on the pixel values extracted by the parallax pixel data extracting unit 137 and the height of the road surface calculated by the road surface height table calculating unit 140 (step S20).

In the conventional process, the height of the road surface is calculated based on the newly obtained parallax pixel data. Therefore, the U map is generated after the V map is generated and the height of the road surface is calculated. Conversely, in the present embodiment, the process of generating the V map and the process of generating the U map can be performed simultaneously.

Further, in the conventional process, the parallax image data is accessed twice to extract pixel values at the time when the V map is generated and when the U map is generated. Conversely, in the present embodiment, by accessing the parallax image data only once, the V map and the U map can be generated. Accordingly, in a case where pixels extracted for generation of the V map overlap with pixels extracted for generation of the U map, the number of times pixels are extracted from the parallax image data can be reduced.

Accordingly, in the present embodiment, image processing for identifying an object by using an images obtained by a stereo camera can be performed at a high speed.

<Variation>

The process of calculating a height of a road surface by the road surface height table calculating unit 140 may be performed as follows.

Figure 7:
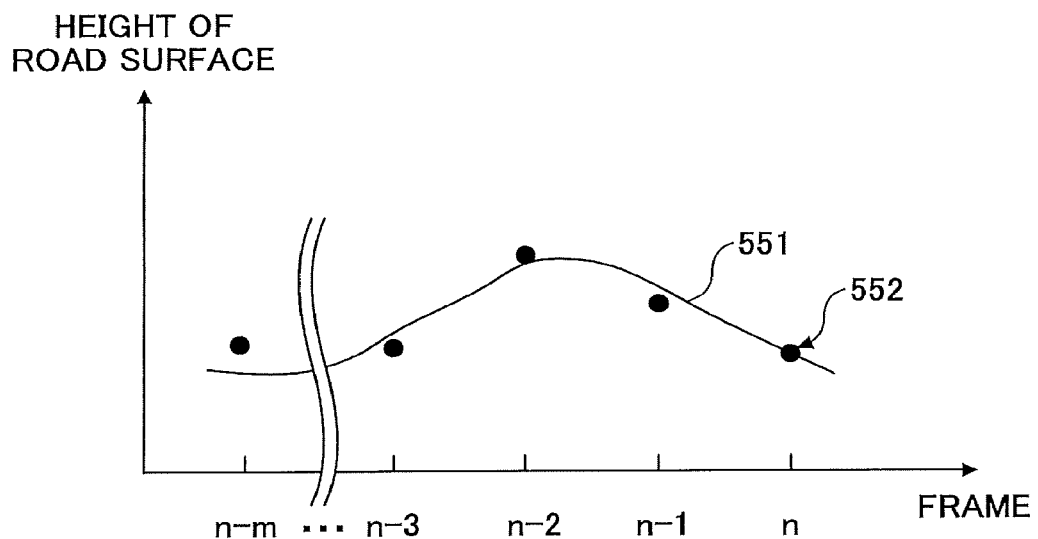
FIG. 7 is a diagram for explaining a process of calculating a height of a road surface

For example, the road surface height table calculating unit 140 may be configured to calculate a height of a road surface based on a plurality of V maps generated based on a plurality of pieces of previously obtained parallax image data. In this case, as illustrated in FIG. 7, based on heights of the road surface and time points (the order of the parallax image frames), the road surface height table calculating unit 140 may be configured to determine an approximate curve by using a curve fitting process so as to calculate a height of the road surface at the current time point. In the example illustrated in FIG. 7, heights of the road surface are calculated based on the V maps of m number of pieces of previously obtained parallax image data. Based on the heights of the road surface and the obtained order of the parallax image data, an approximate curve 551 is determined so as to calculate a height 552 of the road surface at the current time point. Accordingly, even when a vehicle travels on a slope, for example, it is possible to enhance accuracy of calculating a height of a road surface.

Further, a reference straight line 611, which will be described later, may be calculated as a height of a road surface at the current point.

Further, for example, in a case where previously generated V map data does not exist, the following process may be performed. Namely, based on pixel values included in a given area of the parallax image (for example, the above-described first area), a V map corresponding to the area may be generated and a height of the road surface may be calculated. After the complete V map corresponding to the entire parallax image is generated, a height may be calculated based on one or more V maps generated based on one or more pieces of previously obtained parallax image data, as described above. Accordingly, in a case where V map data generated based on previously obtained parallax image data is erased at the time of startup, the process of generating a U map can be simultaneously performed.

<<Process of Extracting Parallax Pixel Data>>

Next, an example of the above-described process of extracting parallax pixel data will be described in detail.

The parallax pixel data extracting unit 137 obtains parallax image data generated by the parallax image generating unit 132. The parallax pixel data extracting unit 137 extracts a combination of (x, y, d), where x is an x-axis direction position, y is a y-axis direction position, and d is a parallax value d, from each parallax pixel data included in the parallax image data at an extraction rate according to each area of the parallax image. The parallax pixel data extracting unit 137 divides the parallax image into a predetermined number of areas in the horizontal direction, for example. In the divided areas, a lowermost area in the vertical direction (top-bottom direction), an uppermost area in the vertical direction, and an area near the center (an example of an area having larger distance values of the object in the range image) are defined. The extraction rate of pixel values are set for each of the areas in such a matter that the extraction rate for the area near the center becomes highest and the extraction rate for the lowermost area becomes lowest.

Figure 8:
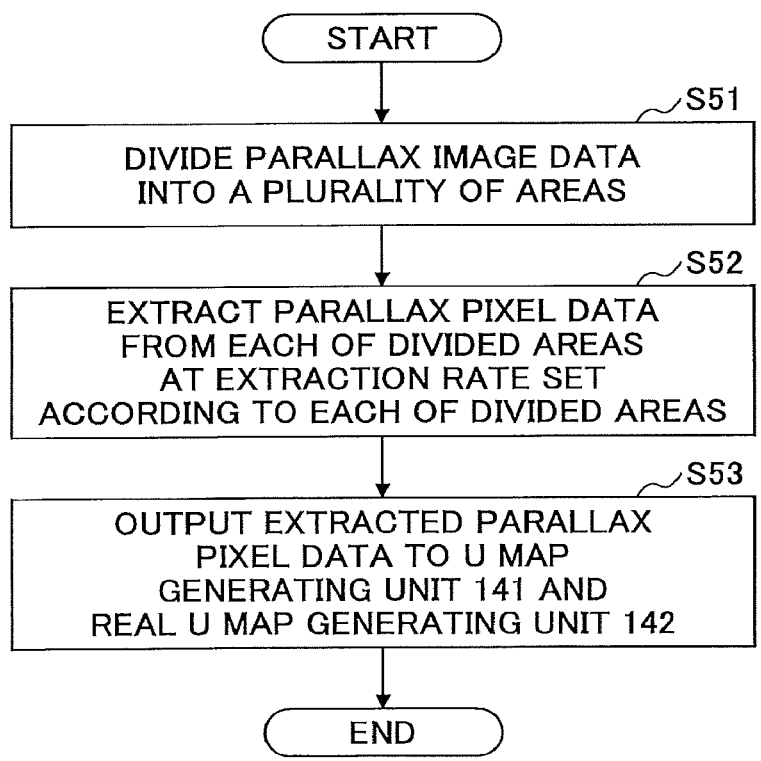
FIG. 8 is a flowchart of a process of extracting parallax pixel data.

Next, referring to FIG. 8, an example of the process performed by the parallax pixel data extracting unit 137 will be described. FIG. 8 is a flowchart of the process of extracting parallax pixel data performed by the parallax pixel data extracting unit 137.

The parallax pixel data extracting unit 137 divides parallax image data at predetermined positions in the vertical direction into a plurality of areas by straight lines parallel to the horizontal direction (the x-axis direction of the parallax image) (step S51).

The parallax pixel data extracting unit 137 extracts parallax pixel data at the extraction rate set according to each of the divided areas (step S52). The parallax pixel data extracting unit 137 outputs the extracted parallax pixel data to both the U map generating unit 141 and the real U map generating unit 142 (step S53).

Next, referring to FIG. 9, the process of dividing parallax image data into a plurality of areas in step S51 of FIG. 8 will be described.

FIG. 9 is a diagram for explaining the process of dividing parallax image data into a plurality of areas by straight lines parallel to the horizontal direction. In the example of FIG. 9, the parallax image data is divided at equal intervals into five areas (hereinafter designated by reference numerals 511 to 515 in the order from top to bottom). The number of divided areas may be any number, and the areas are not required to be divided at equal intervals.

Next, referring to FIG. 10, the process of extracting the parallax pixel data in step S52 of FIG. 8 will be described.

In the example of FIG. 10, the extraction rate for an uppermost area 511 (an example of a second area) is set to a low rate (an example of a second rate), and the parallax pixel data included in the area 511 is extracted at the low rate. When an object exists in the area 511, the object is regarded as a part of a large-sized vehicle such as a truck. There is little possibility that the object exists in this area only. Therefore, the area 511 is regarded as less important in terms of object recognition. Accordingly, the extraction rate of the parallax pixel data included in the less important area is set to the low rate.

The extraction rate for an area 512 is set to a middle rate, for example, and the parallax pixel data is extracted at the middle rate. When an object exists in the area 512, the object is regarded as a distant object such as a vehicle and a person existing at a far distance. Therefore, the area 512 is regarded as more important than area 511 in terms of object recognition. Accordingly, the extraction rate of the parallax pixel data is set to the middle rate.

The extraction rate for areas 513 and 514 (an example of a first area) is set to a high rate, for example, and the parallax pixel data is extracted at the high rate. When an object exists in the area 512, the object is regarded as a nearby object such as a vehicle and a person existing at a short distance. Therefore, the areas 513 and 514 are regarded as more important than the area 512 in terms of object recognition. Accordingly, the extraction rate of the parallax pixel data is set to the high rate.

The extraction rate for a lowermost area 515 (an example of a third area) is set to zero (an example of a third rate), for example, and the parallax pixel data included in the area 515 is not extracted. Accordingly, the process of extracting the parallax pixel data included in the area 515 may be omitted.

For example, when the number of pixels of parallax image data is 1280×800 pixels, the parallax pixel data extracting unit 137 extracts 1/100, 1/50, and 1/3 of all pixel values (parallax pixel data) from the respective areas for which the low, middle, and high extraction rates are set.

<Variation>

The parallax pixel data extracting unit 137 may be configured to vary an extraction rate according to areas into which the parallax image data is divided by straight lines parallel to both or either of the vertical direction and the horizontal direction. In this case, the parallax pixel data extracting unit 137 may be configured to set a relatively high extraction rate for a lower right area and a lower left area in order to ensure that obstacles and children on both the right and left sides of the vehicle 100 are detected.

Further, the parallax pixel data extracting unit 137 may be configured to set a high extraction rate for an area (an example of the first area) including coordinates of pixels corresponding to an extraction range 612 of the road surface, namely an area indicating the road surface in the parallax image, which will be described later. In this case, as illustrating in FIG. 11A and FIG. 11B, for example, an area having a shape in which different rectangles are combined or having a trapezoidal shape may be set, and a high extraction rate may be set for this area. FIG. 11A is an example in which the highest extraction rate is set for an area 514A indicating the road surface in the parallax image and having a shape in which different rectangles are combined. FIG. 11B is an example in which the highest extraction rate is set for an area 514B indicating the road surface in the parallax image and having a trapezoidal shape. An area indicating the road surface may be preliminarily set, or may be dynamically set according to the detection result by the road surface profile detecting process, for example.

By setting a higher extraction rate for an area indicating the road surface in the parallax image, the frequency that pixels extracted to generate a V map overlap with pixels extracted to generate a U map becomes high, allowing recognition processing to be performed at a high speed with improved recognition accuracy.

<<Process of Generating V Map>>

Next, an example of the above-mentioned process of generating a V map will be described in detail.

The V map generating unit 138 performs the process of generating a V map. Each parallax pixel data included in a parallax image data is represented by a combination of (x, y, d) where x is an x-axis direction position, y is a y-axis direction position, and d is a parallax value d. The (x, y, d) is converted into three-dimensional coordinate information (d, y, f) where d is set as the x-axis, y is set as the y-axis, and a frequency f is set as the z-axis. The three-dimensional coordinate information is generated as parallax histogram information. Alternatively, the three-dimensional coordinate information whose frequency f exceeds a predetermined threshold may be selected and generated as parallax histogram information. The parallax histogram information according to the present embodiment includes the three-dimensional coordinate information (d, y, f). A map in which the three-dimensional histogram information is distributed in the x-y two-dimensional coordinate system is referred to as a V map (a parallax histogram map or a V-disparity map.

Specifically, the V map generating unit 138 calculates a frequency distribution of parallax values for each line obtained by dividing the parallax image data into a plurality of areas in the top-bottom direction. The information indicating the frequency distribution of the parallax values is the parallax histogram information.

Figure 12A:
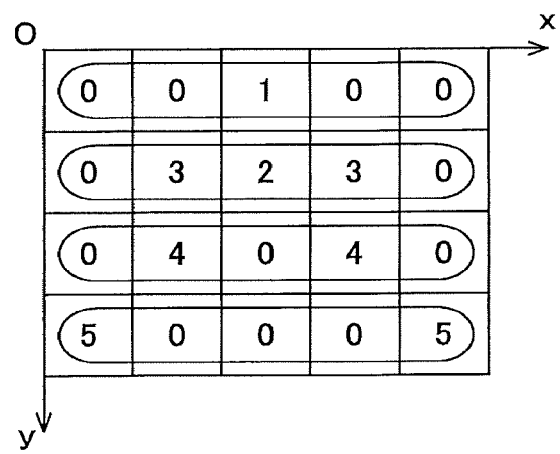
FIG. 12A is a diagram illustrating an example of parallax image data.
Figure 12B:
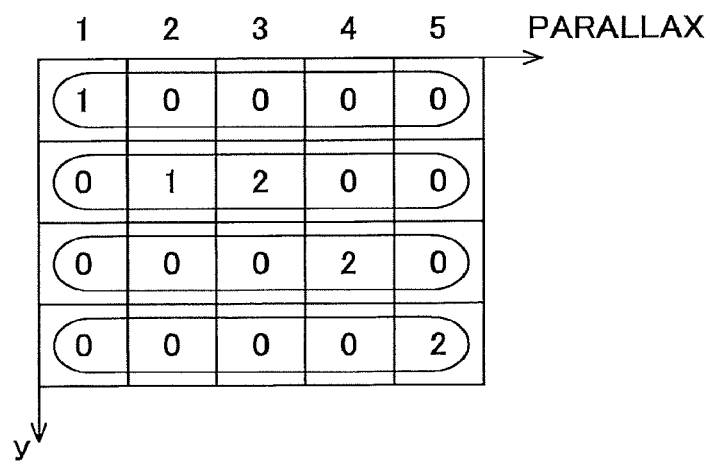
FIG. 12B is a diagram illustrating an example of a V map generated from the parallax image data.

FIG. 12A and FIG. 12B are diagrams for explaining parallax image data and a V map generated from the parallax image data. FIG. 12A is the diagram illustrating an example of a distribution of parallax values of a parallax image. FIG. 12B is the diagram illustrating an example of a V map indicating a frequency distribution of the parallax values for each line of the parallax image of FIG. 12A.

When the parallax image data having the distribution of the parallax values as illustrated in FIG. 12A is input, the V map generating unit 138 calculates a frequency distribution of the parallax values indicating the number of occurrences of the parallax values for each line, and outputs the frequency distribution as parallax histogram information. The information of the frequency distribution of the parallax values obtained in this way is expressed as a two-dimensional coordinate system where the y-axis represent the positions in the y-axis direction of the parallax image (the positions in the top-bottom direction of the captured image) and the x-axis represent the parallax values. As a result, the V map illustrated in FIG. 12B can be obtained. The V map may also be expressed as an image in which pixels each having a pixel value according to the frequency f are distributed in the two-dimensional coordinate system.

Figure 13A:
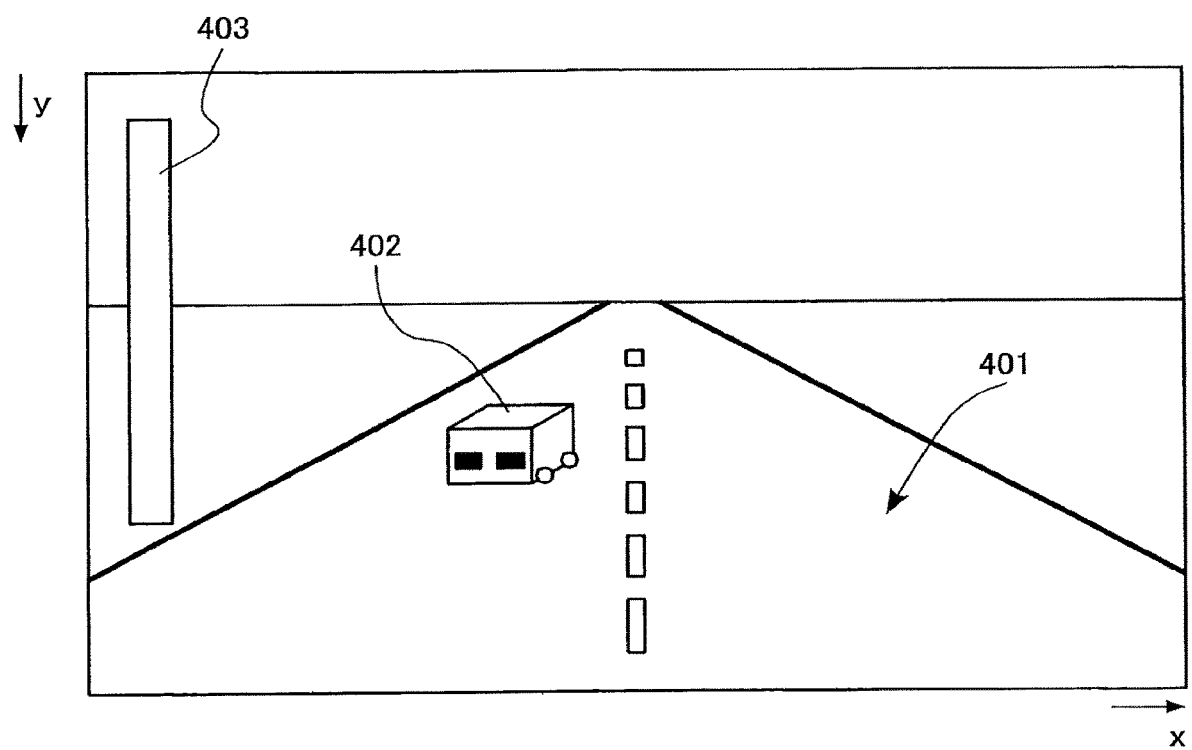
FIG. 13A is a diagram illustrating an example of a captured image obtained as a reference image by one of imaging units.
Figure 13B:
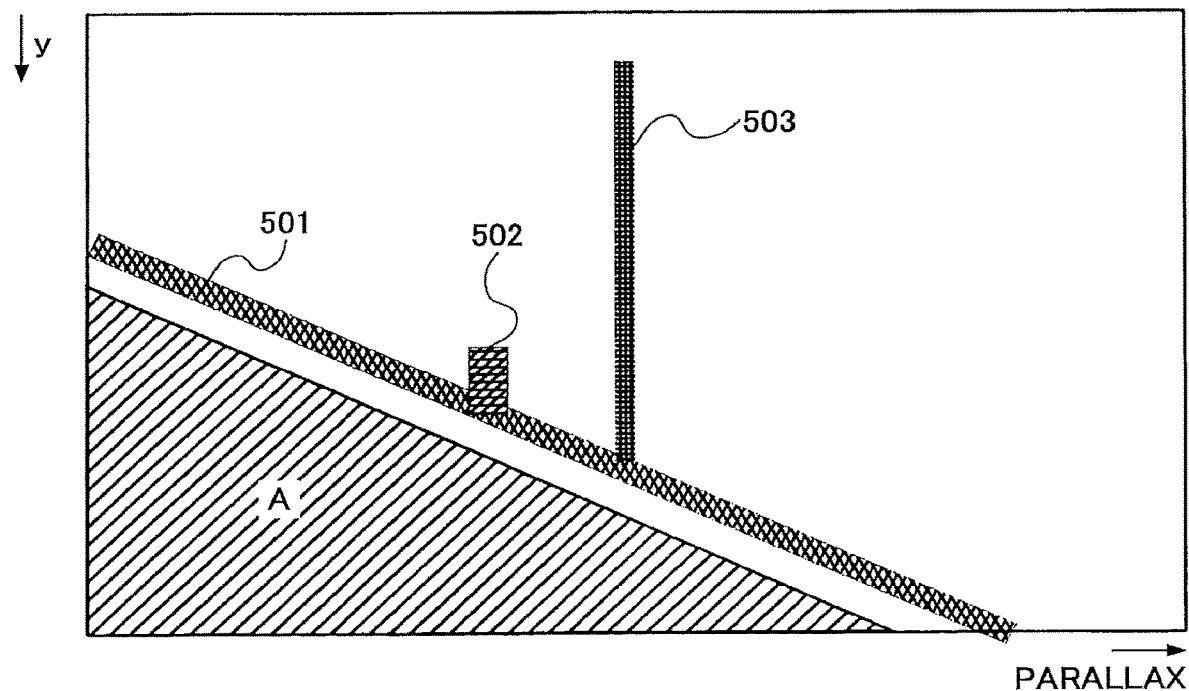
FIG. 13B is a diagram illustrating an example of a V map corresponding to the captured image.

FIG. 13A is a diagram illustrating an example of a captured image obtained as a reference image by one of the imaging units. FIG. 13B is a diagram illustrating an example of a V map corresponding to the captured image of FIG. 13A. Namely, the V map illustrated in FIG. 13B is generated based on the captured image illustrated in FIG. 13A. In the V map, because parallax is not detected from an area below a road surface, no parallax value is counted in an area A shown by hatched lines.

The image illustrated in FIG. 13A indicates a road surface 401, a preceding vehicle 402 existing ahead of the vehicle, and a utility pole 403 existing outside the road surface 401. The V map illustrated in FIG. 13B indicates a road surface 501, a preceding vehicle 502, and a utility pole 503.

In this exemplary image, the road surface ahead of the vehicle is relatively flat. Namely, the road surface ahead of the vehicle is matched to a virtual reference road surface obtained by extending in the vehicle forward direction a road surface parallel to a road surface portion immediately below the vehicle. In this case, high-frequency parallax values in the lower portion of the V map corresponding to the lower portion of the image are distributed along a substantially straight line, in such a manner that the parallax values become larger toward the lower portion of the image and the parallax values become smaller toward the upper portion of the image. It can be understood that pixels indicating the above-described distribution are obtained when an image of a target object having a high occupancy rate in each of the lines of the parallax image with the distance continuously increasing toward the upper portion of the image is captured.

The imaging unit 110a captures an image of an area ahead of the vehicle. Therefore, as illustrated in FIG. 13A, the parallax value d of the road surface decreases toward the upper portion of the image. Also, pixels indicating the road surface have substantially the same parallax value d in the same line. Therefore, points corresponding to the high-frequency parallax values distributed along the substantially straight line in the above-described V map correspond to features of the pixels indicating the road surface. Thus, pixels distributed on or near an approximate line obtained by the linear approximation of high-frequency points on the V map can be estimated as pixels indicating the road surface with high accuracy. Further, a distance to the road surface indicated by the pixels can be obtained based on the parallax value d of the corresponding point on the approximate line with high accuracy.

<<Process of Detecting Road Surface Profile>>

Next, an example of the above-described process of detecting a road surface profile will be described in detail. After the V map generating unit 138 generates the V map information, the road surface profile detecting unit 139 performs the linear approximation of the high-frequency points of the V map, which has a feature indicated by a combination of a parallax value and a y-axis direction position (a V map element) corresponding to the road surface, namely, a feature that the parallax values decreases toward the upper portion of the captured image. When the road surface is flat, the linear approximation can be performed by using one straight line with sufficient accuracy. However, for example, when the road surface condition such as an inclination of the road surface changes in the moving direction of the vehicle, it is difficult to perform the linear approximation by using one straight line with sufficient accuracy. Accordingly, in the present embodiment, the V map information is divided into two or more parallax value segments according to the parallax value, and the linear approximation is performed for each of the parallax value segments separately.

Figure 14:
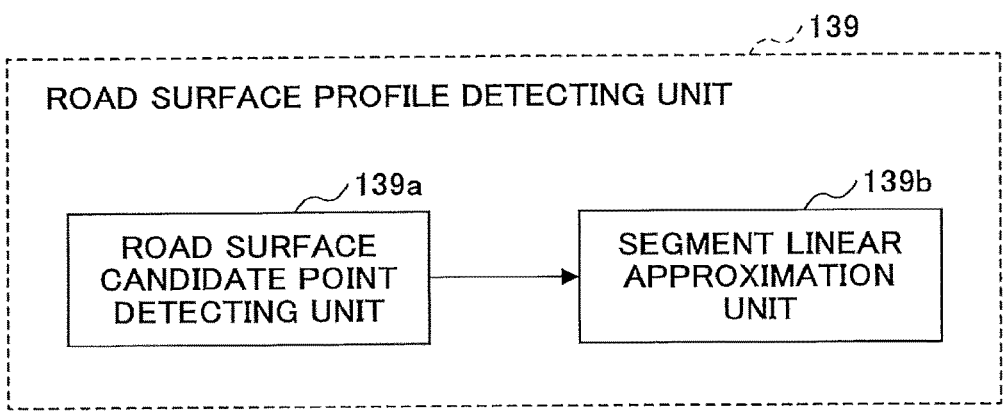
FIG. 14 is a functional block diagram illustrating a road surface profile detecting unit.

FIG. 14 is a functional block diagram illustrating a road surface profile detecting unit 139. After the road surface profile detecting unit 139 of the present embodiment receives the V map information output from the V map generating unit 138, the road surface candidate point detecting unit 139a detects, as road surface candidate points, the high-frequency points on the V map having the feature indicated by the V map element corresponding to the road surface, namely, the feature that parallax values decrease toward the upper portion of the captured image.

In the present embodiment, detection processes of road surface candidate points are performed by the road surface candidate point detecting unit 139a as follows. Specifically, the V map information is divided into two or more parallax value segments according to the parallax values, and based on a determination algorithm corresponding to each of the parallax value segments, road surface candidate points for each of the parallax value segments are determined. For example, the V map is divided into two sections in the x-axis direction (horizontal axis direction) with respect to the parallax value corresponding to a predetermined reference distance, which means a section having a large parallax value and a section having a small parallax value are set. Further, in order to detect road surface candidate points, different algorithms for detecting road surface candidate points are applied to the respective areas. For a short distance section having a large parallax value, a first detection process of road surface candidate points is performed, which will be described later. For a long distance section having a small parallax value, a second detection process of road surface candidate points is performed, which will be described later.

The detection processes of road surface candidate points are separately performed for the short distance section having a large parallax value and the long distance section having a small parallax value because of the following reasons. As illustrated in FIG. 13A, in the captured image capturing the area ahead of the vehicle 100, the occupation area of the road surface in the short distance section is large, and thus the number of pixels corresponding to the road surface is large. Accordingly, the frequency on the V map is large. Conversely, the occupation area of the road surface in the long distance section is small, and thus the number of pixels corresponding to the road surface is small. Accordingly, the frequency on the V map is small. Namely, frequency values of points corresponding to the road surface on the V map become small at a long distance, and become large at a short distance. Therefore, for example, in a case where the same frequency threshold is used to detect road surface candidate points in the short distance section and the long distance section, while the road surface candidate points are properly detected in the short distance section, the road surface candidate points may fail to be detected in the long distance section. Alternatively, many noise components may be detected in the short distance section, and thus detection accuracy of the road surface in the short distance section may decrease. In light of the above, in the present embodiment, a V map is divided into a short distance section and a long distance section, and road surface candidate points are detected by using different reference values and detection methods suitable for the respective sections, allowing detection accuracy of a road surface in each of the sections to be maintained at a high level.

Figure 15:
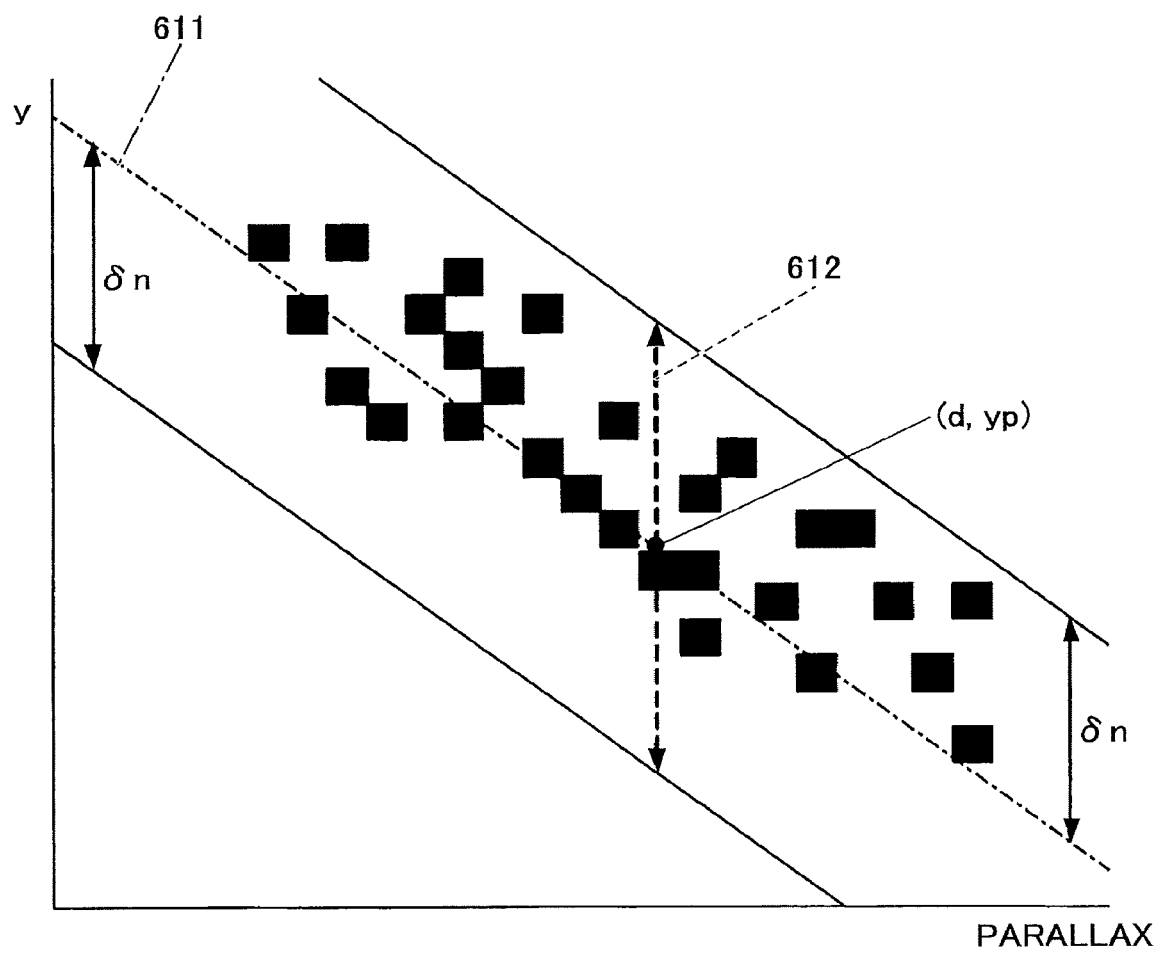
FIG. 15 is a diagram for explaining a first detection process of road surface candidate points and a second detection process of road surface candidate points.

FIG. 15 is a diagram for explaining a first detection process of road surface candidate points and a second detection process of road surface candidate points.

In the first detection process of road surface candidate points, a V map element (d, y, f) included in V map information is searched by changing a y-axis direction position with respect to each parallax value d within a predetermined search range. Specifically, a V map element (d, y, f) having a frequency value f greater than a first frequency threshold is searched. Of the searched V map elements, the V map element having the maximum frequency value f is determined as a road surface candidate point for the corresponding parallax value d. It is preferable to set the first frequency threshold to a relatively small value in order to prevent a V map element corresponding to the road surface from being mistakenly excluded. In the present embodiment, the V map element corresponding to the road surface is extracted by the V map generating unit 138 as described above. Therefore, even if the first frequency threshold is set to the relatively small value, it is unlikely that a V map element that does not correspond to the road surface is determined as a road surface candidate point.

The search range for changing the value y with respect to each parallax value d is the extraction range 612 used by the V map generating unit 138. Namely, the search range is a range of ±5 from the reference line 511 in the top-bottom direction of the image, with a position "yb" in the top-bottom direction of the image being centered. To be more specific, a range from "yp−δn" to "yp+δn" is used as the search range. Accordingly, a y-value range to be searched can be limited, allowing the detection process of the road surface candidate points to be performed at a high speed. Further, the reference straight line 611 may be an approximate line of the road surface detected at the last time (frame captured at the last time). Also, the reference straight line 611 may be a straight line that is set and stored preliminarily by assuming an area where road surface candidate points are detected.

The second detection process of the road surface candidate points is the same as the above-described first detection process of the road surface candidate points, except that a second frequency threshold different from the first frequency threshold is used. In the second detection process of the road surface candidate points, a V map element (d, y, f) included in the V map information is searched by changing a y-axis direction position with respect to each parallax value d within the predetermined search range. Specifically, a V map element (d, y, f) having a frequency value f greater than the second frequency threshold is searched. Of the searched V map elements, the V map element having the maximum frequency value f is determined as a road surface candidate point for the corresponding parallax value d.

Figure 16:
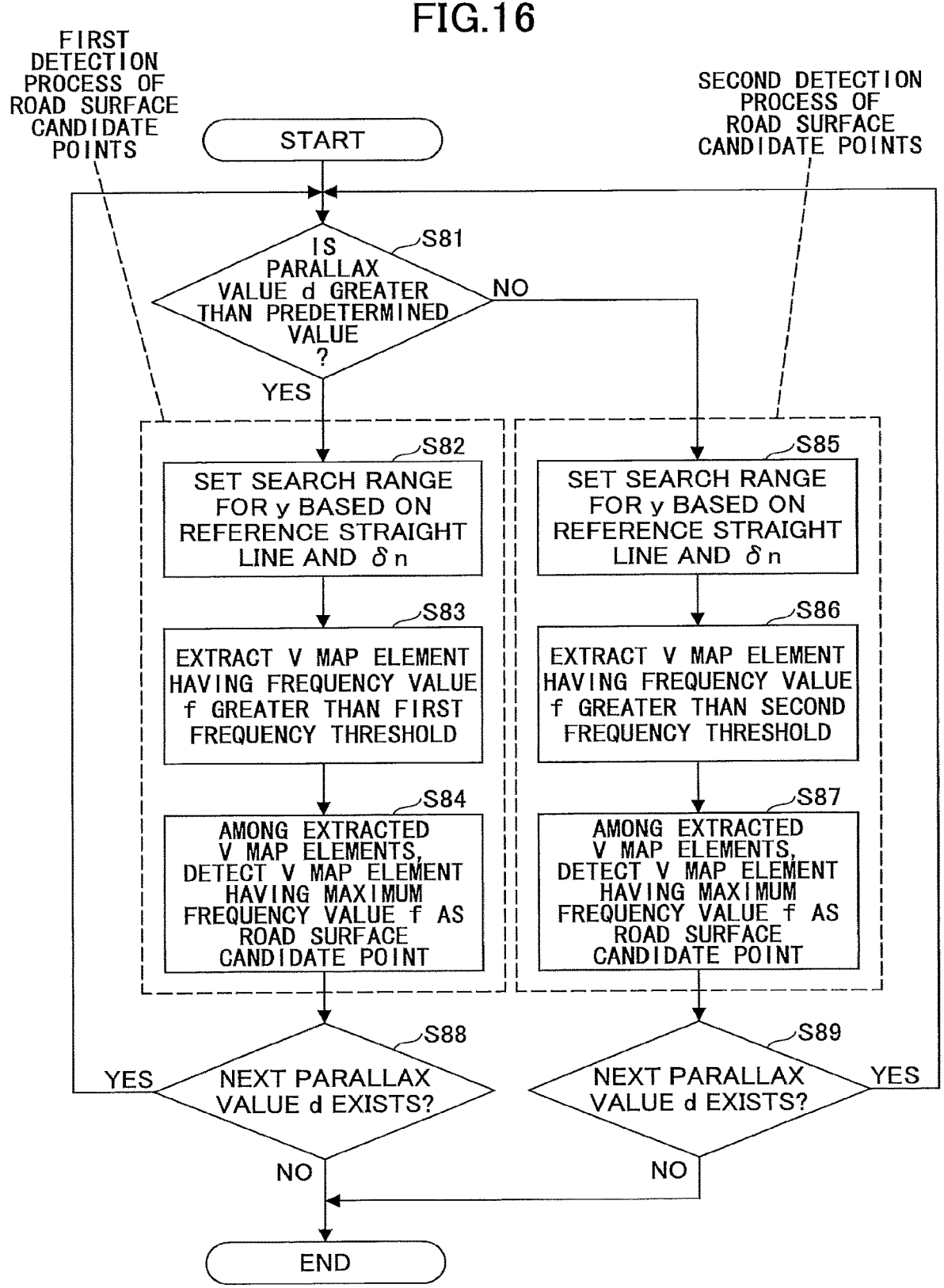
FIG. 16 is a flowchart illustrating detection processes of road surface candidate points.

FIG. 16 is a flowchart illustrating the detection processes of road surface candidate points performed by the road surface candidate point detecting unit 139a.

In the input V map information, road surface candidate points are detected in descending order of parallax value d, and with respect to each of the parallax values d, a road surface candidate point (y, d) is detected. When the parallax value d is greater than a reference parallax value corresponding to a predetermined reference distance (yes in step S81), the above-described first detection process of road surface candidate points is performed. Specifically, the search range for y (the range from "yp−δn" to "yp+δn") is set according to the corresponding parallax value d (step S82), and a V map element (d, y, f) within the search range and having a frequency value "f" greater than the first frequency threshold is extracted (step S83). Then, of the extracted V map elements, the V map element (d, y, f) having the maximum frequency value "f" is detected as a road surface candidate point for the corresponding parallax value d (step S84).

The first detection process of road surface candidate points is repeatedly performed (yes in step S88) until the parallax value d becomes less than or equal to the reference parallax value (no in step S81). When the parallax value d becomes less than or equal to the reference parallax value, the above-described second detection process of road surface candidate points is performed. In the second detection process of road surface candidate points, the search range for y (the range from "yp−δn" to "yp+δn") is set according to the corresponding parallax value d (step S85), and a V map element (d, y, f) within the search range and having a frequency value "f" greater than the second frequency threshold is extracted (step S86). Then, of the extracted V map elements, the V map element (d, y, f) having the maximum frequency value f is detected as a road surface candidate point for the corresponding parallax value d (step S87). The second detection process of road surface candidate points is repeatedly performed until there is no next parallax value (step S89).

In this way, the road surface candidate point detecting unit 139a detects the road surface candidate point (extraction processing target) for each parallax value d. Next, a segment linear approximation unit 139b performs a linear approximation process of the road surface candidate points to obtain an approximate line on the V map. When the road surface is flat, the approximation over the entire parallax value range of the V map can be performed by using one straight line with sufficient accuracy. However, when the road surface condition such as an inclination of the road surface changes in the moving direction of the vehicle, it is difficult to perform the approximation by using one straight line with sufficient accuracy. As described above, in the present embodiment, the V map information is divided into two or more parallax value segments according to the parallax values, and the linear approximation process is performed for each of the parallax value segments separately.

The linear approximation process may be performed by using the least squares approximation. The linear approximation processing may be performed more correctly by using other approximation methods such as the reduced major axis (RMA). The least squares approximation is effective on an assumption that x-axis data does not have error and y-axis data has error. However, considering characteristics of the road surface candidate points detected from the V map information, y-axis data that is the value y of the V map element included in the V map information may indicate a correct position on an image, but x-axis data that is the parallax value d may include error. Further, in the detection processes of road surface candidate points, the road surface candidate points are searched along the y-axis direction and the V map element having the maximum f value is detected as a road surface candidate point. Therefore, the road surface candidate point may also include error in the y-axis direction. Therefore, the V map element may include error in the x-axis direction and the y-axis direction. Accordingly, it is preferable to use a regression line (RMA) compatible with two variables (d and y).

Figure 17:
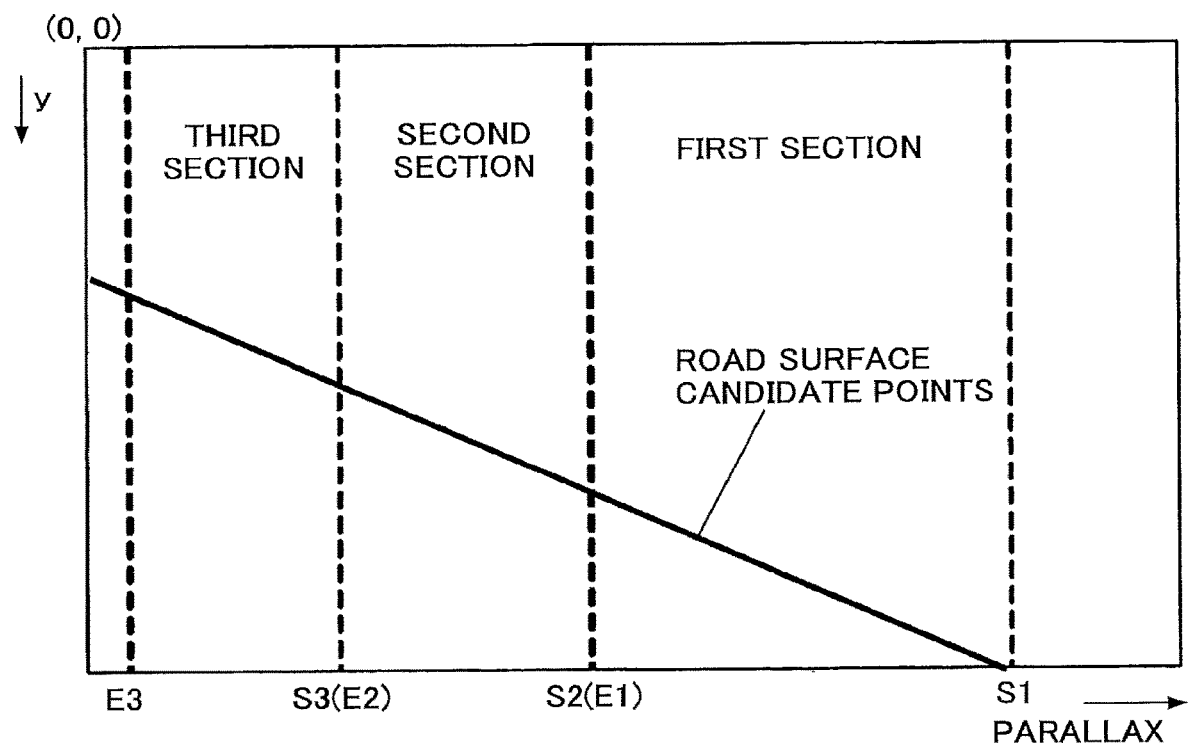
FIG. 17 is a diagram illustrating an example in which a V map is divided into three sections (parallax value segments)

FIG. 17 is a diagram illustrating an example in which the V map is divided into three sections (parallax value segments). In the present embodiment, V map information is divided into three parallax value segments according to the parallax value. To be more specific, in descending order of parallax value, the V map information is divided into a first section, a second section, and a third section. When the V map information is divided into sections equally on the basis of the distance, a longer distance section has a narrower width (a smaller parallax value range) on the V map, causing accuracy of linear approximation to deteriorate. Further, when the V map information is divided into sections equally on the basis of the parallax value, a shorter distance section has a smaller parallax value range on the V map, causing the first section to become too narrow and the linear approximation to become almost useless.

In the present embodiment, the first section is set to have a parallax value range corresponding to a predetermined fixed distance. The second section and the third section are set to respectively have a parallax value range obtained by multiplying a distance of the first section and a parallax value range obtained by multiplying a distance of the second section by a constant number (by two, for example). In this way, a suitable range can be set for each of the sections. Namely, a distance becomes different for each of the sections, but the number of road surface candidate points used for the linear approximation process of each of the sections can be equalized. Accordingly, the linear approximation process can be performed properly for the each of the sections.

Figure 18:
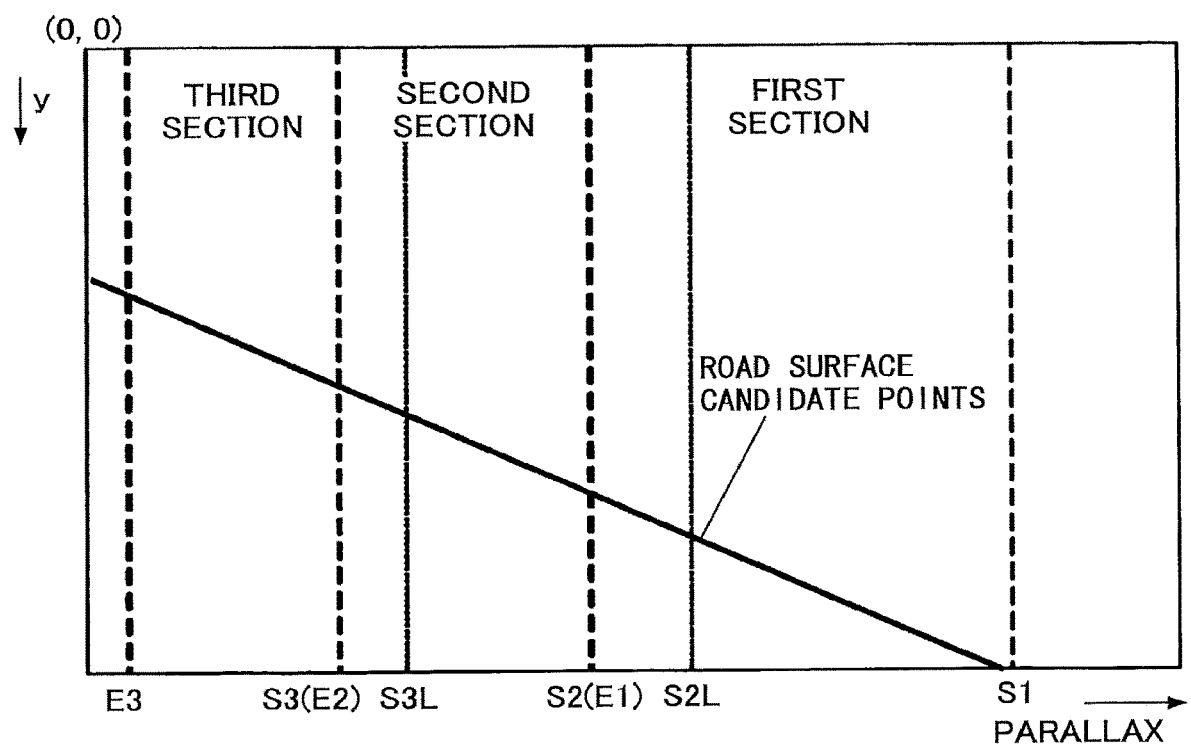
FIG. 18 is a diagram illustrating another example in which a V map is divided into three sections (parallax value segments)

FIG. 17 illustrates the example in which the first section and the second section are continuous without overlapping with each other, and the second section and the third section are continuous without overlapping with each other. However, the sections may overlap with each other. For example, as illustrated in FIG. 18, a start point S2L of the second section may be set to a 3:1 dividing point of the first section (an end point E2 of the second section is the same as that of the example of FIG. 17). A start point S3L of the third section may be set to a 3:1 dividing point between an end point E1 of the first section and the end point E2 of the second section (an end point E3 of the third section is the same as that of the example of FIG. 11).

By changing a distance according to the section or by causing the sections to overlap with each other, the number of candidate points used for the linear approximation process for each of the sections can be equalized, allowing accuracy of the linear approximation process to be enhanced. Further, by causing the sections to overlap with each other, correlation of the linear approximation process between each of the segments can be enhanced.

Figure 19A:
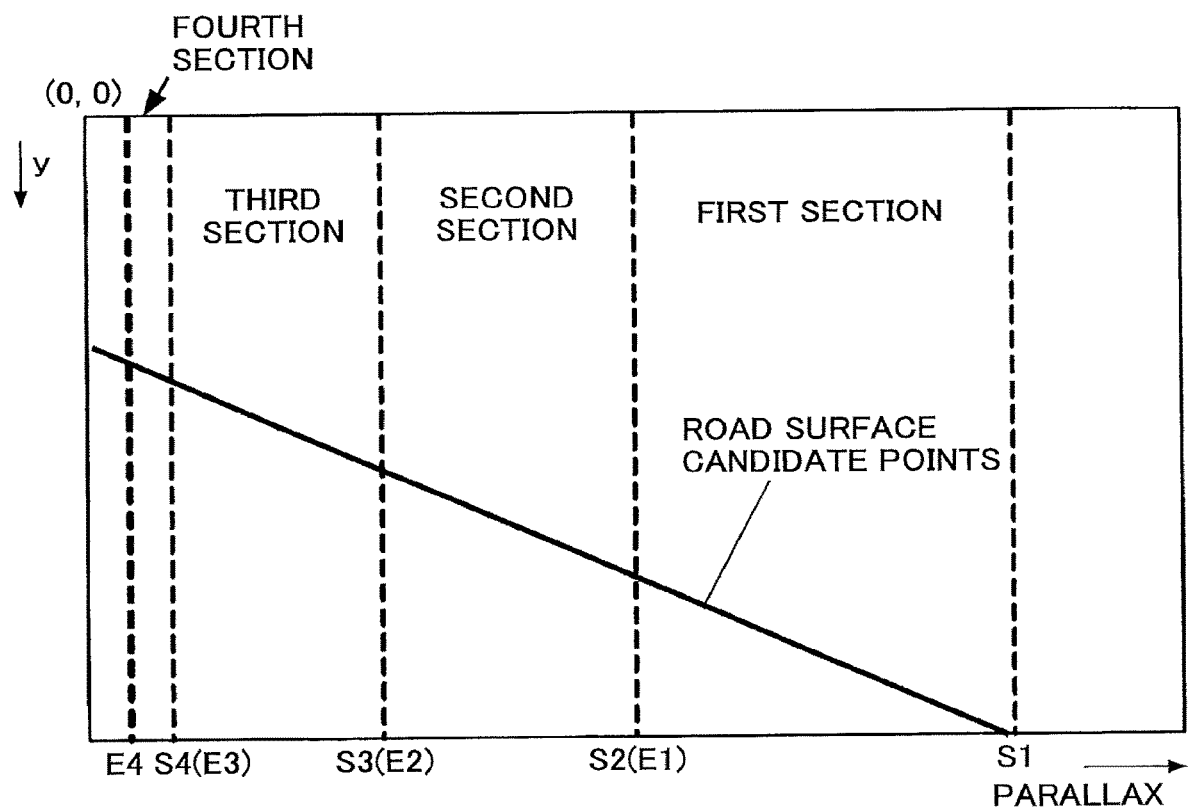
FIG. 19A is a diagram illustrating an example of a V map in which a last section has a narrow width.
Figure 19B:
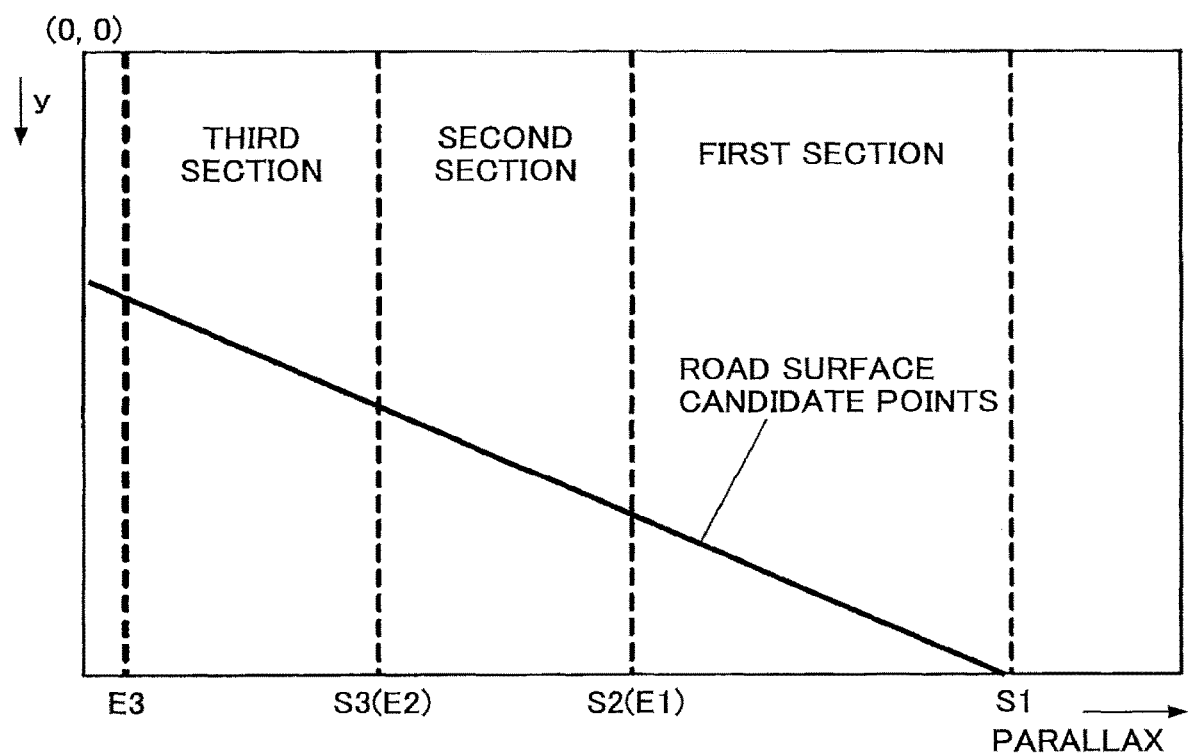
FIG. 19B is a diagram illustrating an example of a V map in which the last section and a preceding section are combined.

Further, when the sections are set in descending order of parallax value, as illustrated in FIG. 19A, for example, a fourth section, which is the last section, may be set to have a parallax value range narrower than a required parallax value range. In this case, as illustrated in FIG. 19B, the last fourth section may be combined with the third section, and the combined section may be set as a single section (as the third section).

Figure 20:
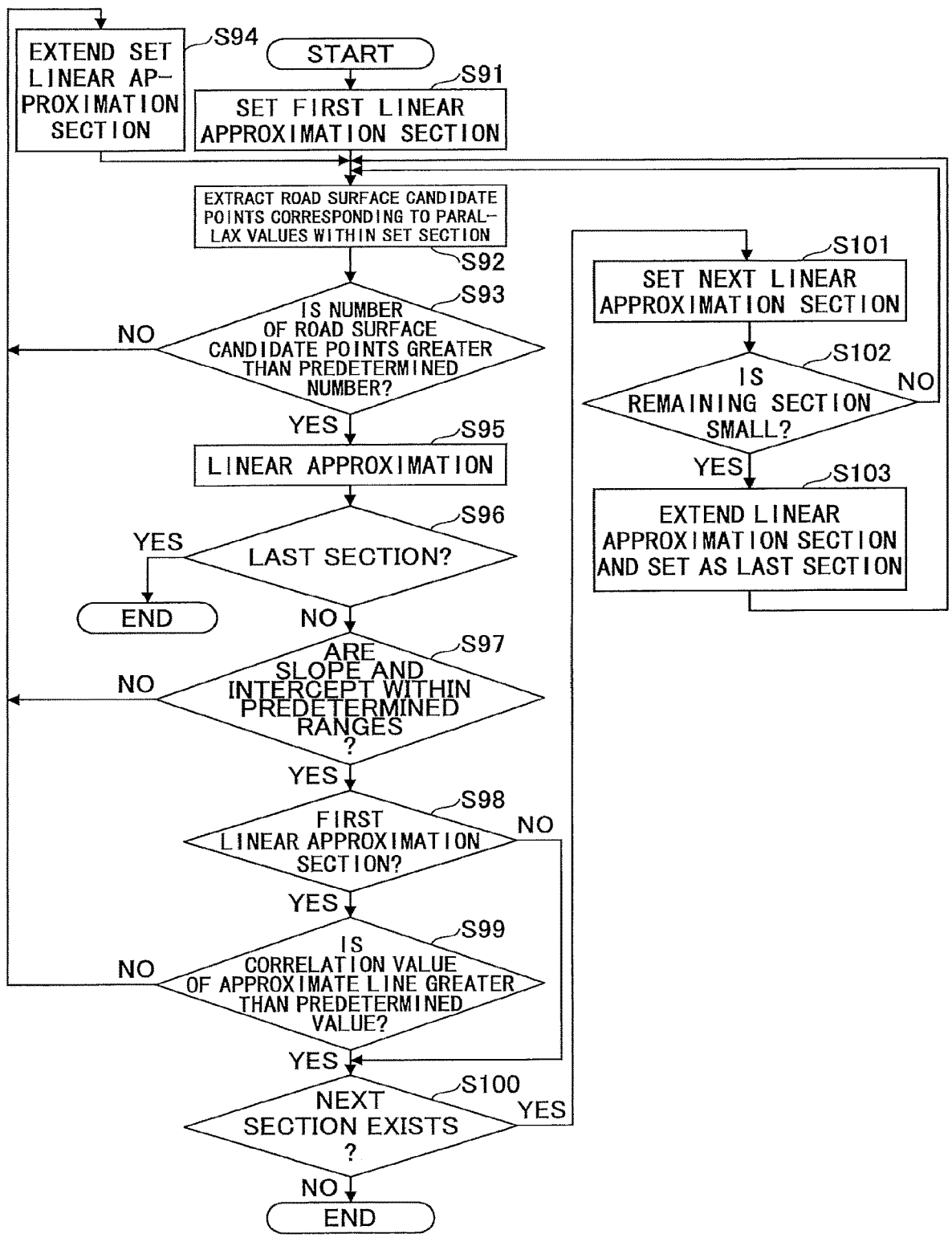
FIG. 20 is a flowchart illustrating a segment linear approximation process.
Figure 21A:
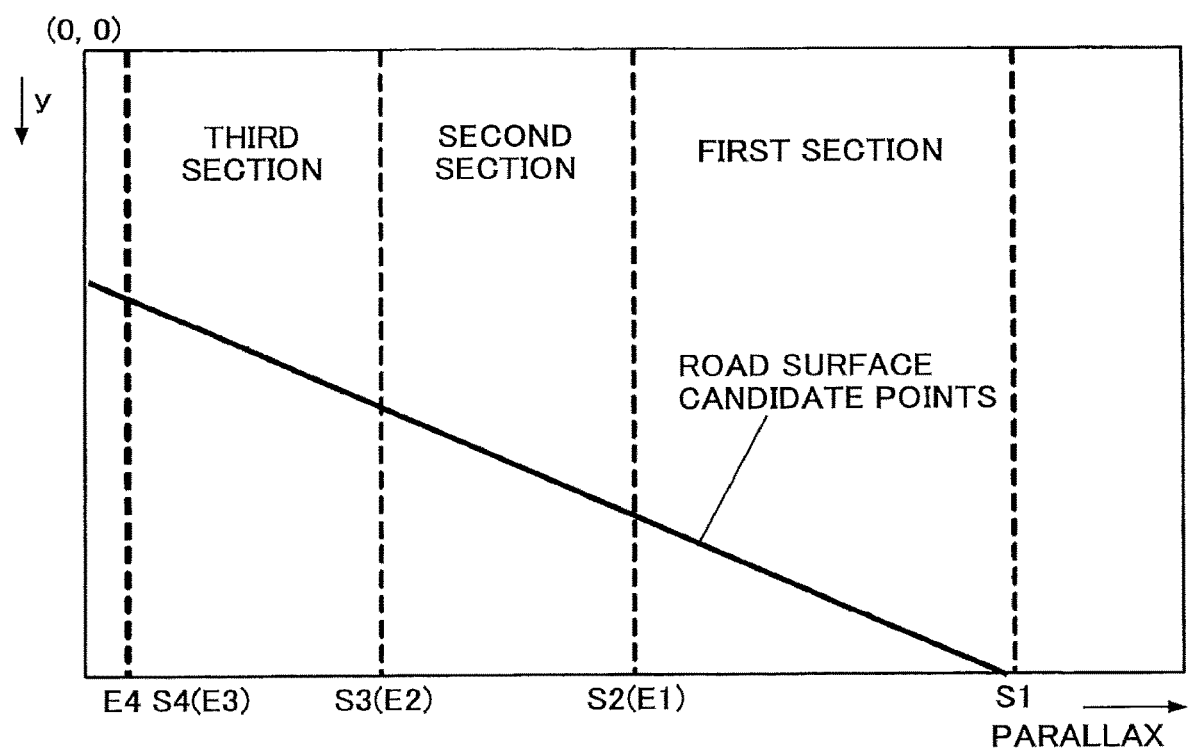
FIG. 21A is a diagram for explaining original sections of a V map.
Figure 21B:
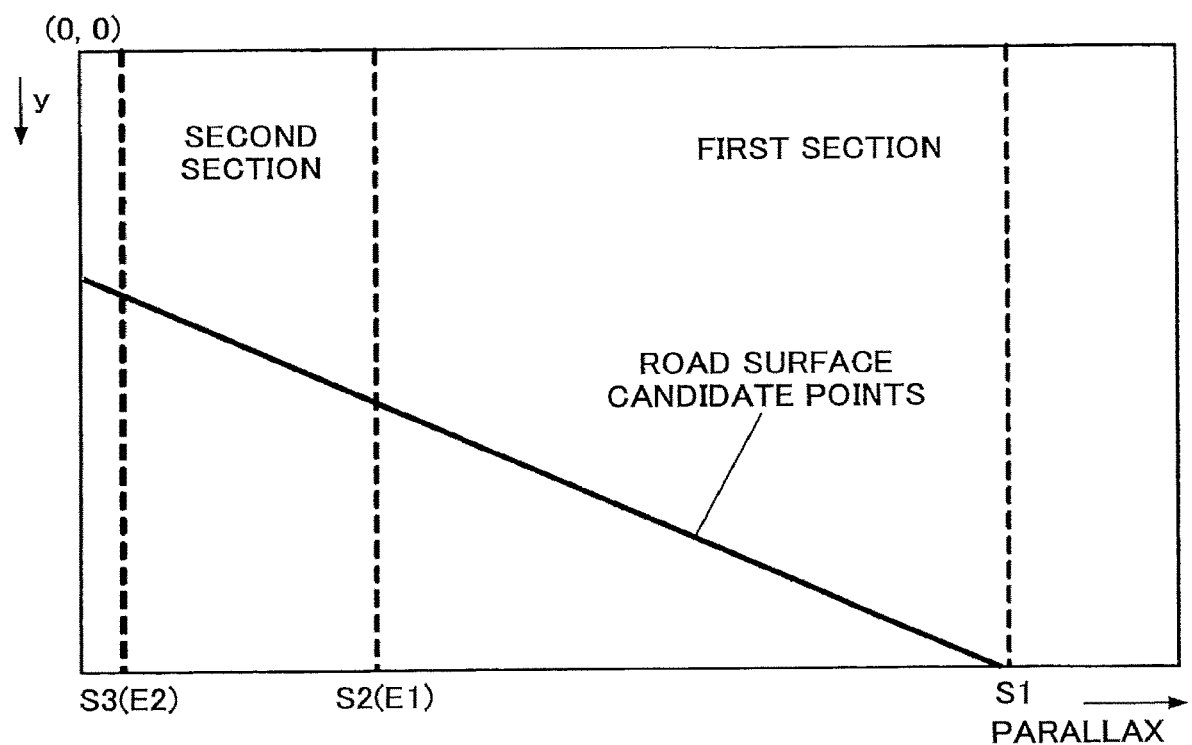
FIG. 21B is a diagram illustrating an example in which a first section of a V map is extended.
Figure 22A:
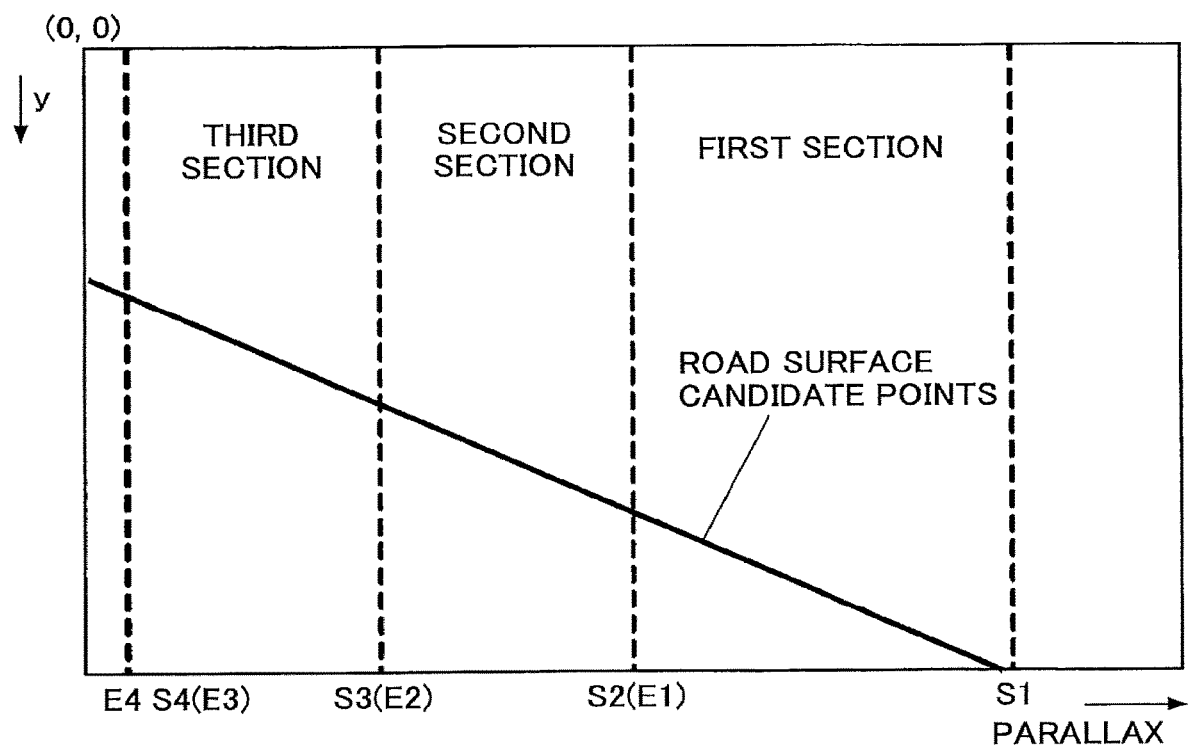
FIG. 22A is a diagram for explaining original sections of a V map.
Figure 22B:
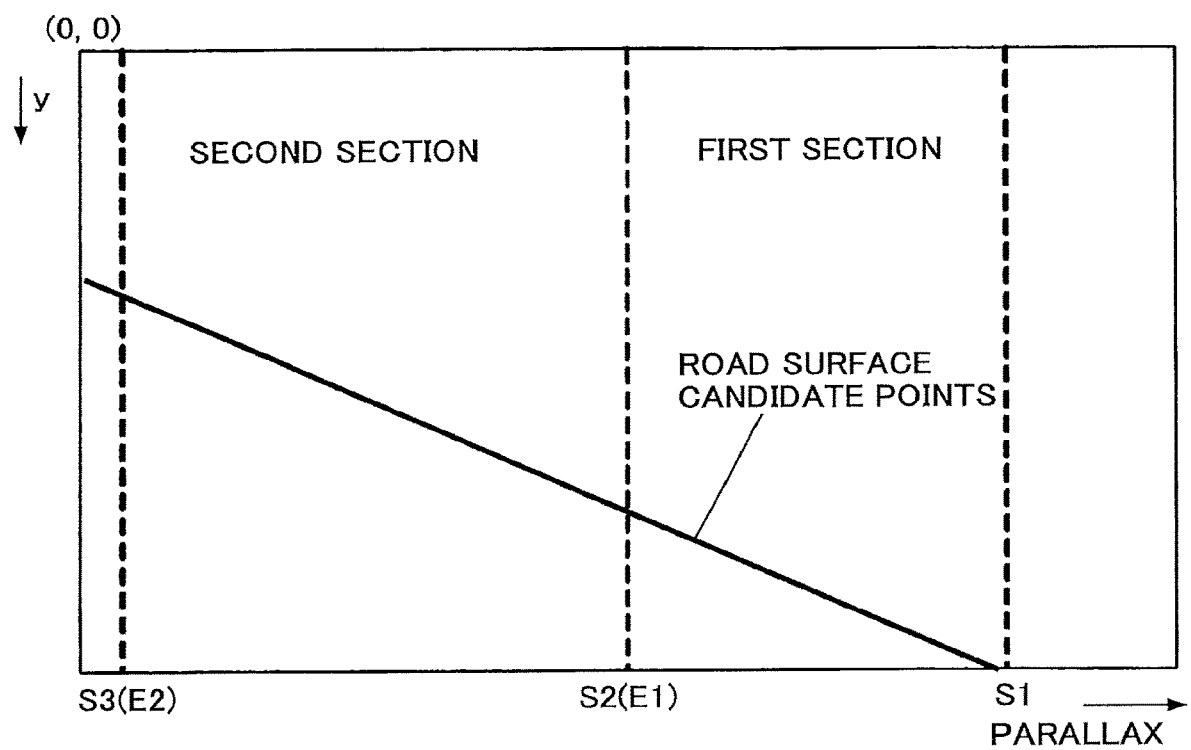
FIG. 22B is a diagram illustrating an example in which a second section of a V map is extended.
Figure 23A:
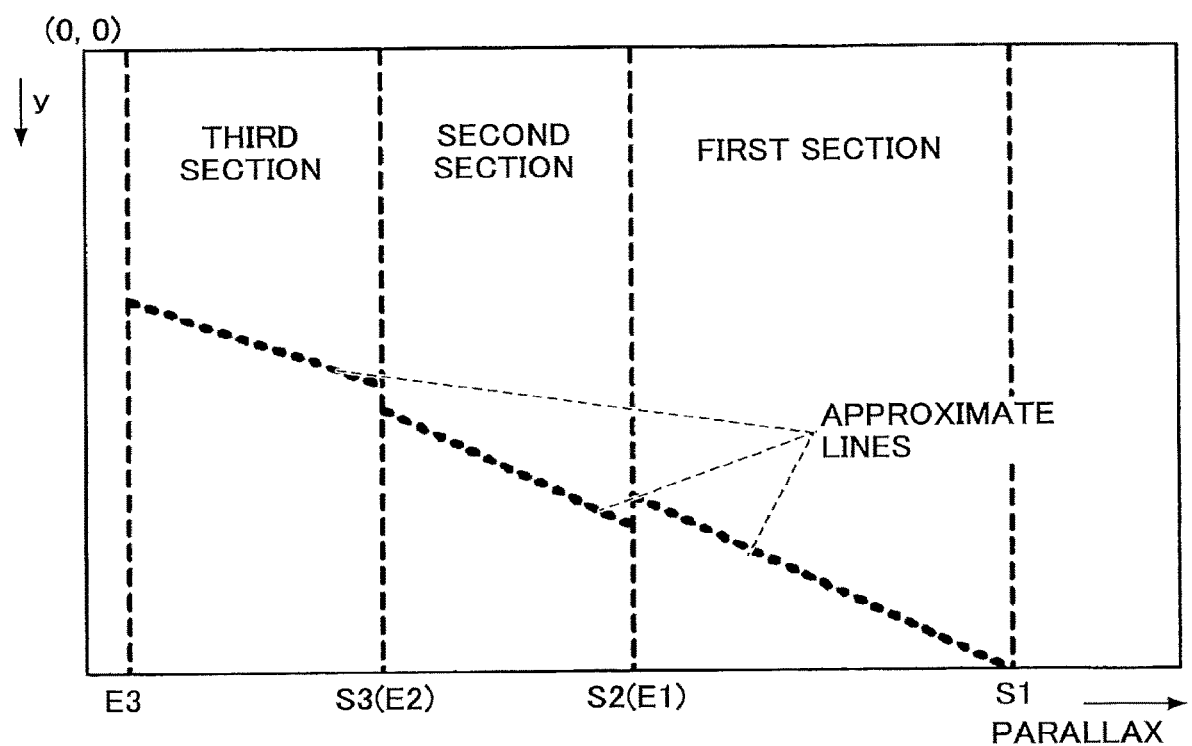
FIG. 23A is a diagram illustrating an example in which approximate lines are not continuous at section boundaries of a V map.
Figure 23B:
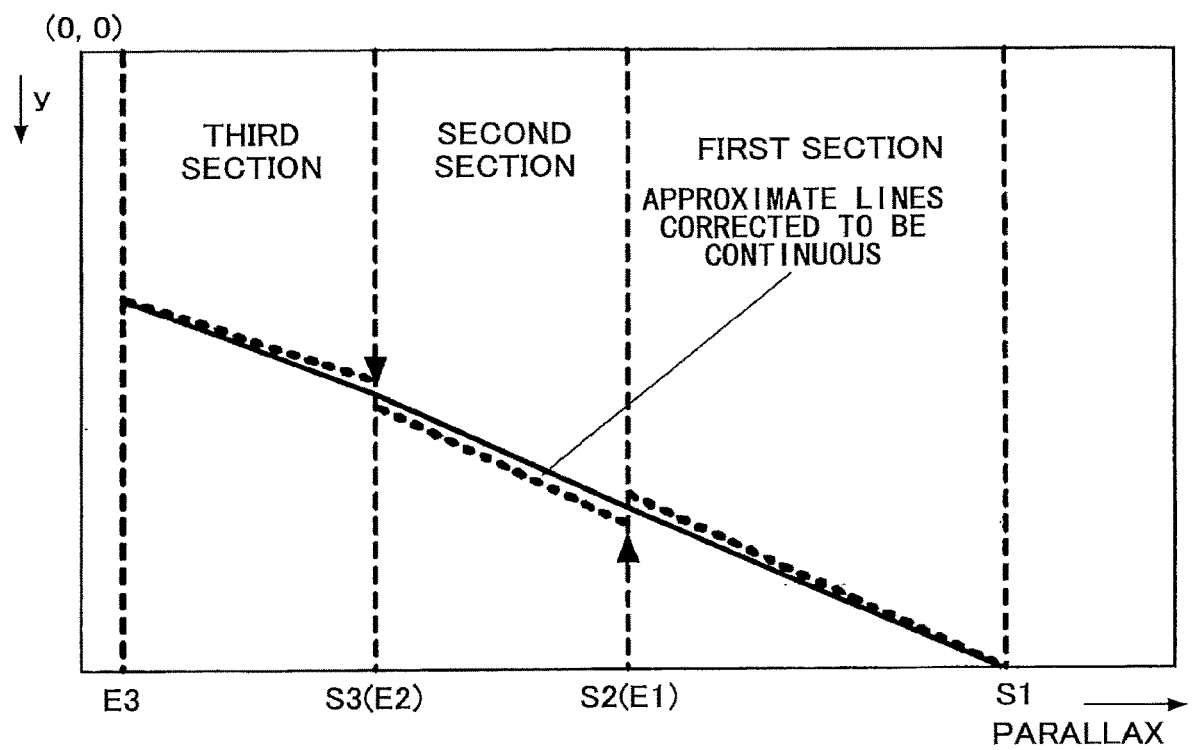
FIG. 23B is a diagram illustrating an example in which the approximate lines are corrected to be continuous at the section boundaries of the V map.

FIG. 20 is a flowchart illustrating the segment linear approximation process performed by the segment linear approximation unit 139b. FIG. 21A is a diagram for explaining original sections. FIG. 21B is a diagram for explaining an example in which the original first section is extended. FIG. 22A is a diagram for explaining original sections. FIG. 22B is a diagram for explaining an example in which the original second section is extended. FIG. 23A is a diagram for explaining an example in which obtained approximate lines of sections are not continuous at section boundaries. FIG. 23B is a diagram for explaining an example in which the approximate lines are corrected to be continuous at the section boundaries.

Upon receiving road surface candidate point data output from the road surface candidate point detecting unit 139a, the segment linear approximation unit 139b sets a first section having the shortest distance (a section having the largest parallax value) (step S91). Then, the segment linear approximation unit 139b extracts road surface candidate points corresponding to the parallax values "d" in the first section (step S92). When the number of the extracted road surface candidate points is less than or equal to a predetermined value (no in step 93), the first section is extended by a predetermined parallax value (step S94). To be more specific, the original first and second sections illustrated in FIG. 21A are combined into a single section (the extended first section) as illustrated in FIG. 21B. At this time, the original third section becomes a new second section. Subsequently, the road surface candidate points corresponding to the parallax values d in the extended first section are extracted again (step S92). When the number of the extracted road surface candidate points is greater than the predetermined value (yes in step S93), the linear approximation process is performed for the extracted road surface candidate points (step S95).

When a section other than the first section, such as the second section, is extended, the original second section and the original third section as illustrated in FIG. 22A are combined into a single section (an extended second section) as illustrated in FIG. 22B.

After the linear approximation process is performed (no in S96), reliability determination of the approximate line obtained by the linear approximation process is performed. In this reliability determination, it is determined whether a slope and an intercept of the obtained approximate line are within predetermined ranges (step S97). When the slope and the intercept are not within the predetermined ranges (no in step S97), the first section is extended by the predetermined parallax value (step S94), and the linear approximation process is performed again for the extended first section (steps S92 through S95). When the slope and the intercept are within the predetermined ranges (yes in step S97), it is determined whether the section that has undergone the linear approximation process is the first section (step S98).

When it is determined that section that has undergone the linear approximation process is the first section (yes in step S98), it is determined whether a correlation value of the approximate line is greater than a predetermined value (step S99). When the correlation value of the approximate line is greater than the predetermined value, the approximate line is determined as an approximate line of the first section. When the correlation value of the approximate line is less than or equal to the predetermined value, the first section is extended by the predetermined parallax value (step S94). For the extended first section, the linear approximation process is performed again (steps S92 through S95) and also the reliability determination is performed again (steps S97 to S99). When it is determined that the section that has undergone the linear approximation process is not the first section (no in step S98), the determination step (step S99) for the correlation value of the approximate line is not performed.

Subsequently, it is determined whether a next section exists (step S100). When no next section exists (no in step S100), the segment linear approximation process ends. Conversely, when a next section exists (yes in step S100), the next section (second section) is set to have a parallax value range corresponding to a distance obtained by multiplying the distance corresponding to the width of the preceding section by a constant number (step S101). Subsequently, it is determined whether the above-described set section is smaller than a remaining section (third section) that is to be set next (step S102). When it is determined that the above-described set section is not smaller (no in step S102), the road surface candidate points corresponding to the parallax values d in the second section are extracted, and the linear approximation processing (step S92 through S95) and the reliability determination processing (steps S97 through S99) are performed.

In this way, the sections are set sequentially, and the linear approximation process and the reliability determination are repeatedly performed for the sections. Alternatively, in step S102, when it is determined that the above-described set section is smaller than the remaining section that is to be set next (yes in step S102), the above-described set section is extended to include the remaining section, and the extended section is set as the last section (step S103). In step S96, when it is determined that the section is the last section (yes in step S96), the segment linear approximation process ends.

Typically, approximate lines obtained as described above by performing the linear approximation for each section by the segment linear approximation unit 139b are not continuous at section boundaries as illustrated in FIG. 23A. In the present embodiment, the approximate lines output from the segment linear approximation unit 139b are corrected as illustrated in FIG. 23B such that the approximate lines of the sections become continuous at the section boundaries. Specifically, for example, approximate lines are corrected to pass through a middle point between the end points of the approximate lines of two adjacent sections at the section boundary.

<<Process of Calculating Road Surface Height Table>>

Next, an example of the above-described process of calculating a road surface height table will be described in detail.

The road surface height table calculating unit 140 performs a process of calculating a road surface height (a relative height from a road surface portion immediately below the vehicle) and generating a road surface height table. Based on the information on the approximate lines on the V map generated by the road surface profile detecting unit 139, a distance to each road surface portion indicated by each line area (each position in the top-bottom direction of the image) of the captured image can be calculated. Also, it is predetermined to which line area in the captured image each road surface portion, of the virtual plane extending in the moving direction of the vehicle to be parallel to the road surface portion immediately below the vehicle, is projected. This virtual plane (reference road surface) is expressed by a straight line (reference straight line 611) on the V map. By comparing the approximated straight line, output from the road surface shape detection unit 135, with the reference straight line 611, a height of a road surface portion ahead of the vehicle can be obtained. In a simplified method, a height of a road surface portion existing ahead of the vehicle at a distance obtained from the corresponding parallax value is calculated based on the y-axis direction position on the approximate line output from the road surface profile detecting unit 139. The road surface height table calculating unit 140 generates a table in which the height of each road surface portion obtained from the approximate line is stored for a required parallax range.

The height of an object from the road surface can be calculated as follows. When the object is at a position corresponding to the y-axis direction position y' for a given parallax value d, the height of the object from the road surface can be calculated by (y'−y0), where y0 denotes the y-axis direction position on the approximate line for the given parallax value d. Generally, the height H of an object from the road surface corresponding to the coordinates (d, y') on the V map can be calculated by the following formula (2).

$$H = z \times (y' - y0)/f \tag{2}$$

In the formula, "z" represents a distance calculated from the parallax value d (z=BF/(d−offset)), and "f" represents a value obtained by converting the focal distance of the camera into the same unit as the unit of (y'−y0). "BF" represents a value obtained by multiplying a base distance and a focal distance of the stereo camera, and "offset" represents a parallax value when an object at infinity is captured.

<<Process of Generating U Map>>

Next, an example of the above-described process of generating a U map will be described in detail.

The U map generating unit 141 performs the process of generating a U map, including generating a frequency U map and generating a height U map.

In the process of generating a frequency U map, each parallax pixel data included in the parallax image data extracted by the parallax pixel data extracting unit 137 includes the combination of (x, y, d) where x is an x-axis direction position, y is a y-axis direction position, and d is a parallax value d. By setting x as the x-axis, d as the y-axis, and the frequency as the z-axis, x-y two-dimensional histogram information is generated, which is referred to as a frequency U map. In the present embodiment, based on the height of each road surface portion included in the table generated by the road surface height table calculating unit 140, the U map generating unit 141 generates a frequency U map for points (x, y, d) of the parallax image having a given height H within a predetermined height range (from 20 cm to 3 m, for example) from the road surface. With this configuration, an object existing in the predetermined height range from the road surface may be extracted appropriately.

In the process of generating the height U map, each parallax pixel data included in the parallax image data extracted by the parallax pixel data extracting unit 137 includes the combination of (x, y, d) where x is an x-axis direction position, y is a y-axis direction position, and d is a parallax value d. By setting x as the x-axis, d as the y-axis, and the height from the road surface as the z-axis, x-y two-dimensional histogram information is generated, which is referred to as a height U map. The height values on the z-axis are the highest points from the road surface.

Figure 24:
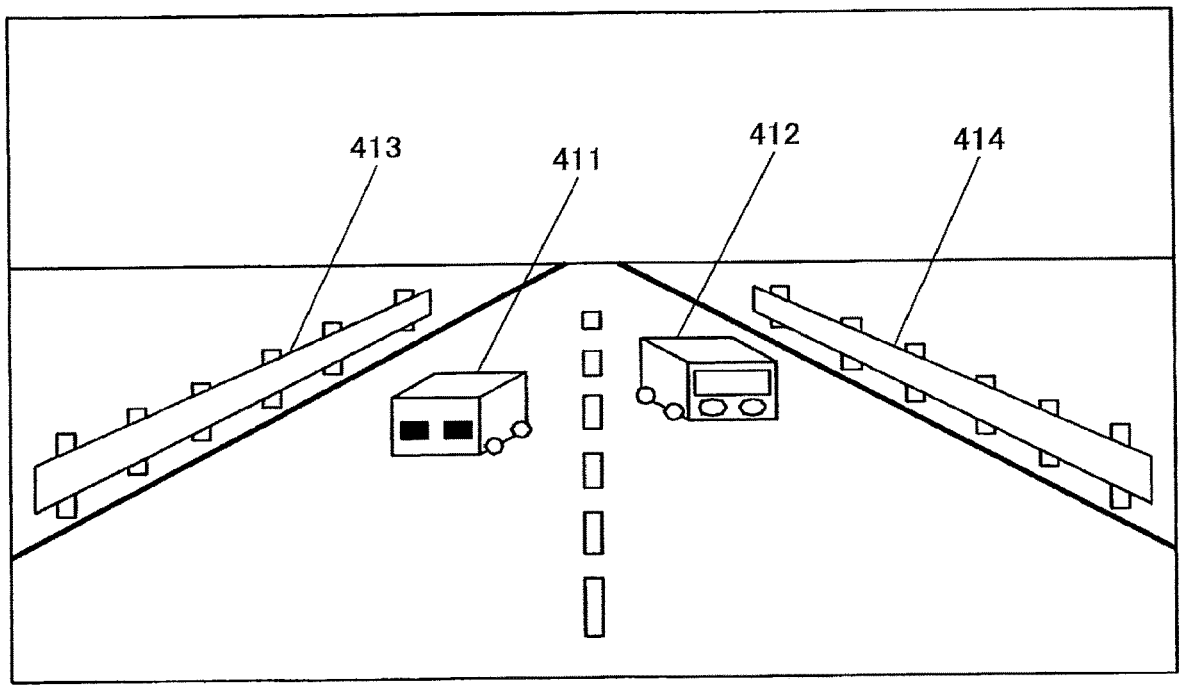
FIG. 24 is a diagram schematically illustrating an example of a reference image.
Figure 25A:
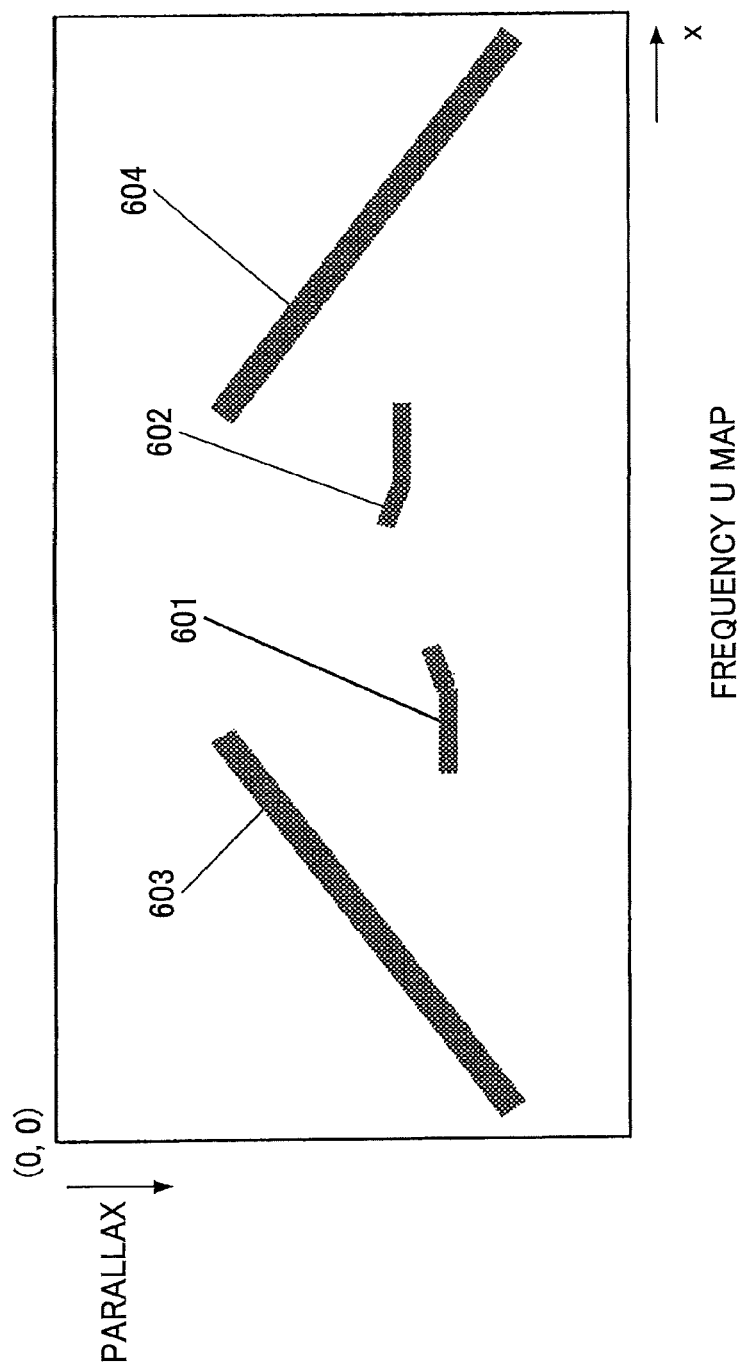
FIG. 25A is a diagram illustrating an example of a frequency U map.
Figure 25B:
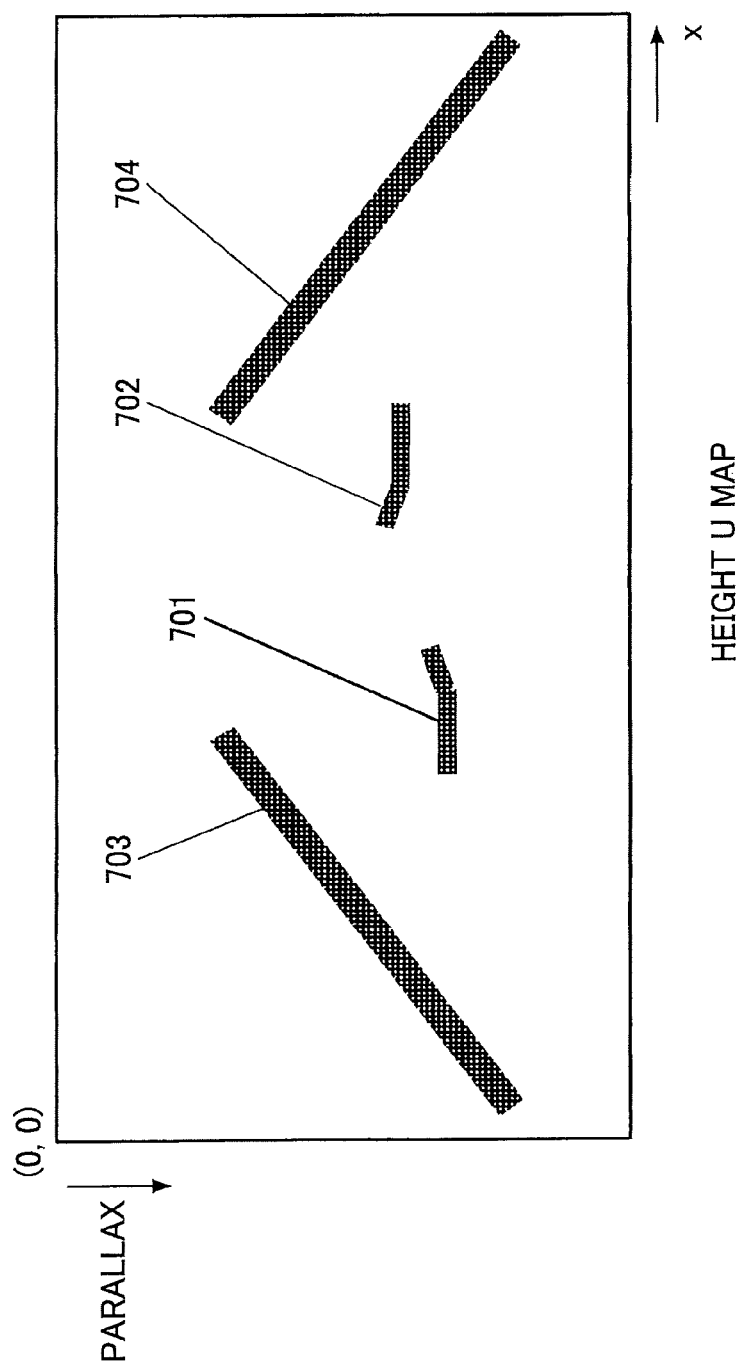
FIG. 25B is a diagram illustrating an example of a height U map.

FIG. 24 is an exemplary image schematically illustrating a reference image captured by the imaging unit 110a. FIGS. 25A and 25B illustrate U maps corresponding to the exemplary image of FIG. 24. FIG. 25A is a frequency U map, and FIG. 25B is a height U map.

In the exemplary image illustrated in FIG. 24, guardrails 413 and 414 exist on left and right sides of a road surface, and a preceding vehicle 411 and an oncoming vehicle 412 exist on the road surface. In this example, as illustrated in FIG. 25A, high-frequency points corresponding to the left and right guard rails 413 and 414 are plotted as substantially straight lines 603 and 604 extending upward from the left end and the right end toward the center. Further, high-frequency points corresponding to the preceding vehicle 411 and the oncoming vehicle 412 are plotted as lines 601 and 602 substantially parallel to the X-axis direction between the left and right guardrails. Further, in a case where side portions of the preceding vehicle 411 and the oncoming vehicle 412 are displayed in addition to a rear portion of the preceding vehicle 411 and a front portion of the oncoming vehicle 412, differing parallax arises in an image area in which the preceding vehicle 411 and the oncoming vehicle 412 are displayed. In this case, as illustrated in FIG. 25A, high-frequency points corresponding to these vehicles are plotted as a line substantially parallel to the X-axis direction and a line slanted to the X-axis direction, and these lines are connected.

In the height U map, the highest points of the left and right guardrails 413 and 414, the preceding vehicle 411, and the oncoming vehicle 412 are plotted in a manner similar to the frequency U map. In this example, the heights of a distribution 701 of points corresponding to the preceding vehicle and a distribution 702 of points corresponding to the oncoming vehicle are higher than the heights of distributions 703 and 704 of points corresponding to the guardrails. With this configuration, height information of objects in the height U map may be used to detect the objects.

<<Process of Generating Real U Map>>

Next, the real U map generating unit 142 will be described. The real U map generating unit 142 performs a process of generating a U map, including generating a real frequency U map and generating a height U map.

The real U map is generated by converting the horizontal axis of the U map from units of pixels of an image into an actual distance, and converting the vertical axis of the U map from a parallax value to thinned-out parallax having a thinning rate according to the distance.

In the process of generating a real frequency U map, the real U map generating unit 142 generates, based on the combination of (x, y, d) where x is an x-axis direction position, y is a y-axis direction position, and d is a parallax value d, x-y two-dimensional histogram information by setting the actual direction in the horizontal direction as the x-axis, the thinned-out parallax as the y-axis, and the frequency as the z-axis. Similarly to the U map generating unit 141, in the present embodiment, based on the height of each road surface portion included in the table generated by the road surface height table calculating unit 140, the real U map generating unit 142 generates a frequency U map for only the points (x, y, d) of the parallax image having the height H within the predetermined height range from the road surface. Further, the real U map generating unit 142 may be configured to generate a real U map based on the U map generated by the U map generating unit 141.

FIG. 26 is a diagram illustrating a real U map (hereinafter referred to as a real frequency U map) corresponding to the frequency U map illustrated in FIG. 25A. As illustrated in FIG. 26, the right and left guardrails are represented by vertical line patterns 803 and 804, and the preceding vehicle and the oncoming vehicle are represented by patterns 801 and 802, which have shapes close to actual shapes. The thinned-out parallax in the vertical axis is set, such that no thinning is set for a long distance (50 m or more), one-half (½) thinning is set for a middle distance (20 m or more to less than m), one-third (⅓) thinning is set for a short distance (10 m or more to less than 20 m), one-eighth (⅛) thinning is set for a short distance (10 m or more to less than 20 m).

Namely, the thinning amount is reduced as the distance increases. Because an object at a long distance is formed as a small image, the amount of parallax data is small and distance resolution is also small, and thereby the thinning amount is reduced. Conversely, an object at a short distance is formed as a large image, the amount of parallax data is large and distance resolution is also high, and thereby the thinning amount is increased.

Figure 27:
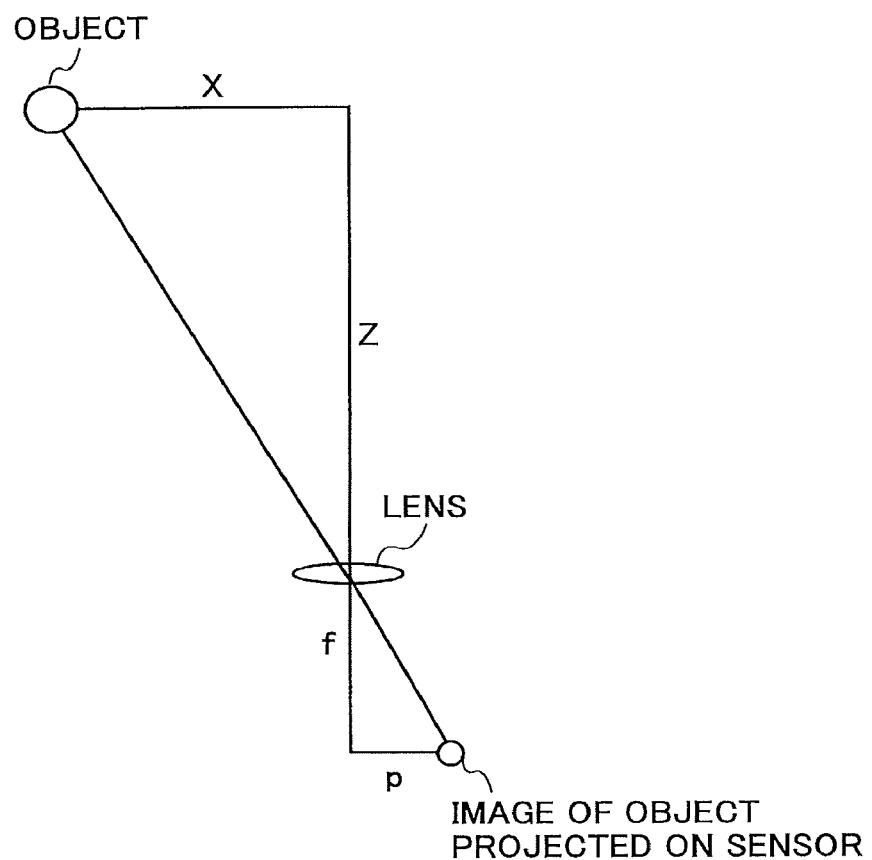
FIG. 27 is a diagram for explaining a method for calculating a value of a horizontal axis of the real U map from a value of a horizontal axis of the U map.

Referring to FIG. 27, a method for converting the horizontal axis from units of pixels of an image into an actual distance, that is, a method for calculating (X, d) of the real U map from (x, d) of the U map will be described.

Specifically, a width between a left side and a right side both at a distance of 10 m from a stereo camera, that is, a width of 20 m is set as an object detection range. When it is assumed that a width of one pixel of the real U map in the horizontal direction is 10 cm, the horizontal direction size of the real U map becomes 200 pixels.

In FIG. 27, "f" denotes a focal distance, "p" denotes a position in the horizontal direction of the sensor from the center of the camera, "z" denotes a distance from the camera to an object, and "X" denotes a position in the horizontal direction of the object from the center of the camera. When denotes a pixel size of the image sensor, a relationship between "x" and "p" is expressed by "x=p/s". Further, based on the characteristics of the stereo camera, the equation "Z=Bf/d" is established.

As illustrated in FIG. 27, the equation "X=p×Z/f" is established, and the equation "X=s×B/d" is also established. "X" indicates the actual distance. Because the width of one pixel in the horizontal direction on the real U map is, for example, 10 cm, a position of X on the real U map can be easily calculated.

Further, a real U map corresponding to the height U map of FIG. 25B (hereinafter referred to as a real height U map) can be generated in the same procedure.

Lengths of the real U map in the vertical direction and in the horizontal direction can be set smaller than lengths of the U map, allowing high speed processing. Further, as the horizontal direction position does not depend on the distance, the same object can be detected with the same width, regardless of whether the object is at a long distance or at a short distance. Accordingly, a process of removing peripheral areas and a process of determining horizontal separation or vertical separation (width threshold processing) can be easily performed.

The length of the U map in the vertical direction is determined by the measurable shortest distance (meters). Namely, because "d=Bf/Z" is established, the maximum value of "d" is determined according to the measurable shortest distance "z". Further, because the parallax value d includes a decimal portion, the parallax value is multiplied by a predetermined number and the decimal portion is rounded off such that the nearest integer is used as the parallax value.

When "Z" becomes one half (½), a value of d increases two times. Therefore, data of the U map becomes large. Therefore, when the real U map is generated, as the distance becomes nearer, more pixels are thinned out so as to compress the data and reduce the data amount as compared to the U map. Accordingly, it is possible to perform fast objection detection by labeling.

<<Detection of Isolated Region>>

Figure 28:
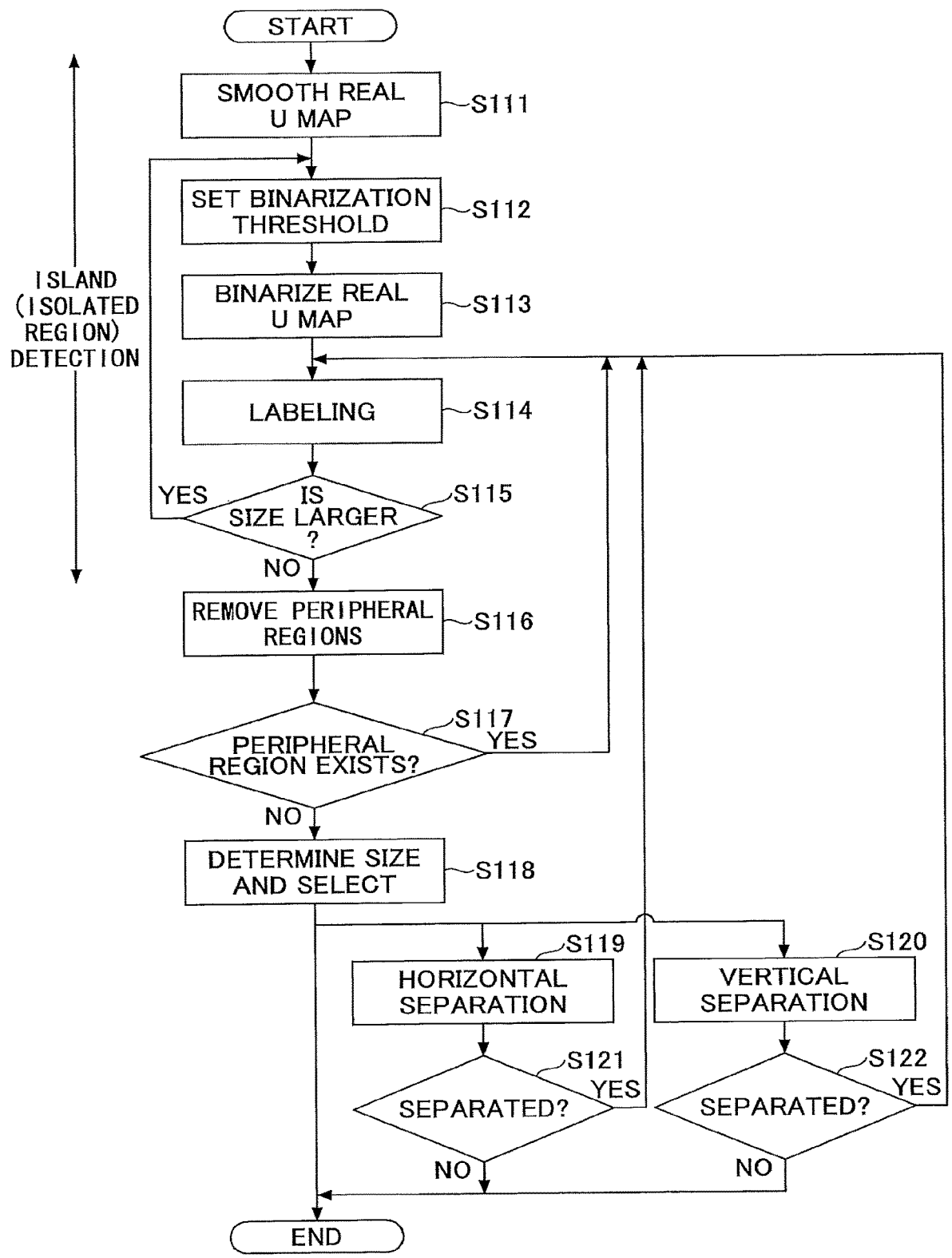
FIG. 28 is a flowchart illustrating a process of detecting an isolated region.

Next, an isolated region detecting unit 143 will be described. FIG. 28 is a flowchart illustrating a process of detecting an isolated region performed by the isolated region detecting unit 143. First, the isolated region detecting unit 143 performs smoothing of the frequency real U map generated by the real U map generating unit 142 (step S111).

By averaging frequency values, an effective isolated region can be easily detected. Because parallax values include calculation error, and also parallax values are not calculated for the entire pixels, the real U map includes noise unlike the example illustrated in FIG. 26. Therefore, the real U map is smoothed such that the noise can be removed and an object to be detected can be easily separated. For example, a smoothing filter (for example, simple average of 3×3 pixels) may be applied to frequency values of the real U map (frequency real U map). As a result, noise frequency can be reduced and frequency values in object regions become higher compared to peripheral regions. Accordingly, the subsequent process of detecting an isolated region can be facilitated.

Next, a binarization threshold is set (step S112). First, the smoothed real U map is binarized by using a small value (=0) (step S113). Subsequently, coordinates with values are labeled and isolated regions are detected (step S114).

In steps S113 and S114, an isolated region (hereinafter referred to as an island) having frequency greater than frequency of peripheral regions in the real frequency U map is detected. In order to detect the isolated region, the real frequency U map is binarized (step S113). First, the real frequency U map is binarized by using a threshold value of zero "0". An island may be isolated or an island may be connected to another island depending on the height and the shape of an object and also depending on the road surface parallax. Namely, by binarizing the real frequency U map starting from a small threshold, an isolated island with a suitable size may be detected, and subsequently, by increasing the threshold, connected islands may be separated. In this way, isolated islands having suitable sizes can be detected.

A labeling method is used as a method for detecting an island after binarization (step S114). Coordinates indicated in black after the binarization (coordinates having frequency values greater than the binarization threshold) are labeled based on the connection status, and a region with the same label is regarded as an island.

The size of each of the detected plurality of isolated regions is determined (step S115). Because a detection target may be a pedestrian or a large-sized vehicle, it is determined whether the width of an isolated region is within a size range. If the size is larger than the size range (yes in step S115), the binarization threshold is incremented by 1 (step S112), and the binarization is performed for the isolated region in the real frequency U map (step S113). Subsequently, the labeling is performed so as to detect a smaller isolated region (step S114), and the size of the detected isolated region is determined (step S115).

The above-described steps from the threshold setting through the labelling are performed repeatedly such that an isolated region having a desired sized is detected. When the isolated region having the desired side is detected (no in step S115), peripheral regions are removed (step S116). When an object is at a far distance and the detection accuracy of the road surface is low, parallax of the object and parallax of the road surface may be detected as one block. In this case, peripheral regions existing in the vicinity of the object and having a height close to the height of the road surface are removed. When a peripheral region still exists (yes in step S117), the labeling is performed again and an isolated region is set again (step S114).

When a peripheral region required to be removed no longer exists, the size (width, height, and distance) of the isolated region from which the peripheral regions have been removed is determined (step S118). Based on the result, horizontal separation (step S119) or vertical separation (step S120) is performed, or no further processing is performed. As a result, the isolated region is registered as a candidate object. When the horizontal separation or the vertical separation is performed (yes in step S121 or yes in step S122), the labeling is performed again and an isolated region is set again (step S114).

When two objects (such as an automobile and a motorbike, an automobile and a pedestrian, and two automobiles) exist closely side by side, the objects may be detected as a single isolated region due to smoothing of the real frequency U map. Alternatively, the objects may be connected with each other due to an adverse effect of parallax interpolation of the parallax image. The horizontal separation detects such cases and separates the objects (the details will be described later).

Further, when a plurality of preceding vehicles are traveling far away on the adjacent lanes, and the distribution of parallax of the preceding vehicles obtained from the stereo image is large, parallax values of the objects may extend in the upper and lower directions on the real frequency U map and may be connected with each other. As a result, the plurality of objects may be detected as a single isolated region. The vertical separation detects such cases and separates the objects into a nearby preceding vehicle and a faraway preceding vehicle (the details will be described later).

<<Detection of Parallax Image Correspondence Region and Extraction of Object Region>>

Figure 29:
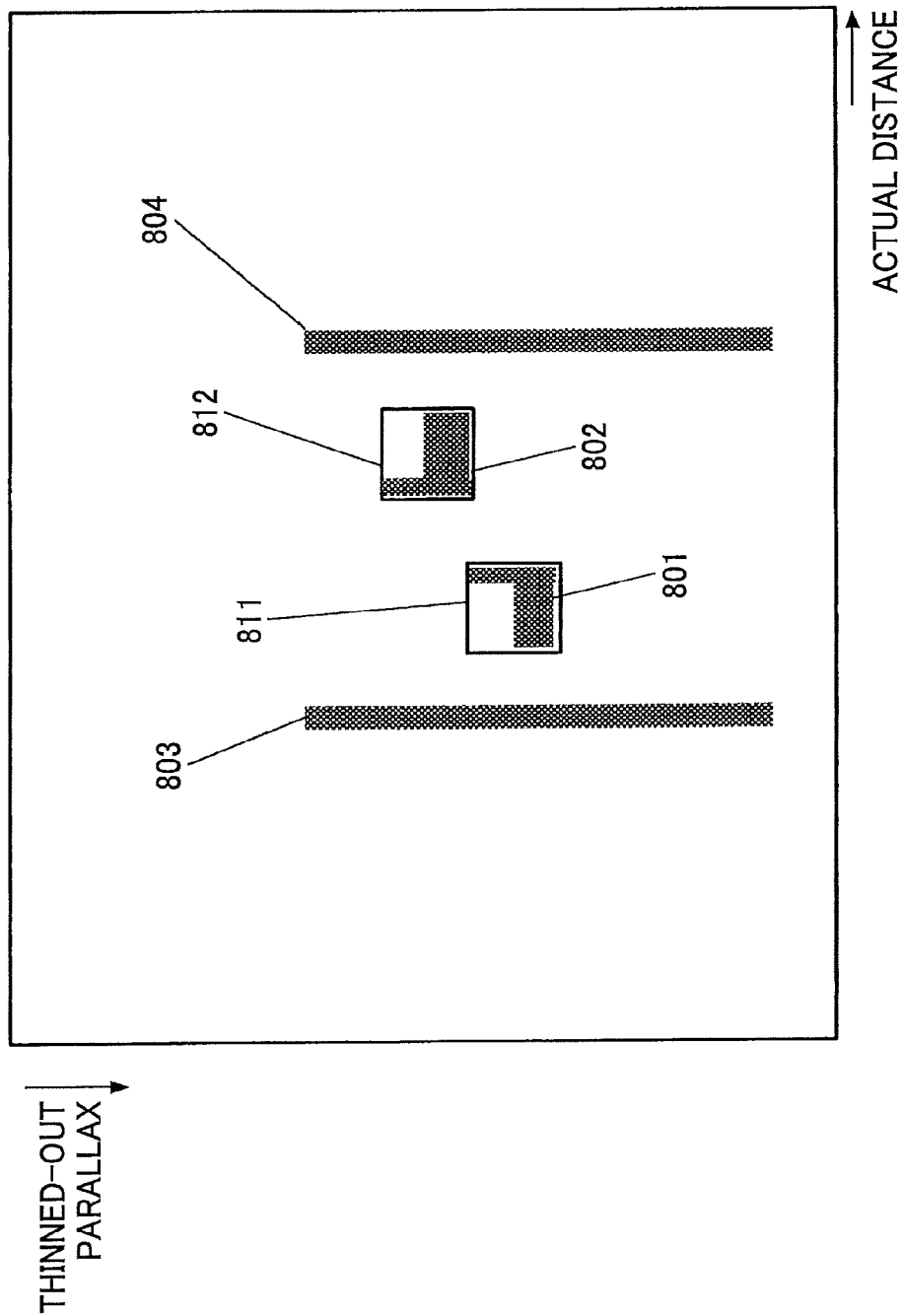
FIG. 29 is a diagram illustrating a real frequency U map in which a rectangular region inscribed by an isolated region is set.
Figure 30:
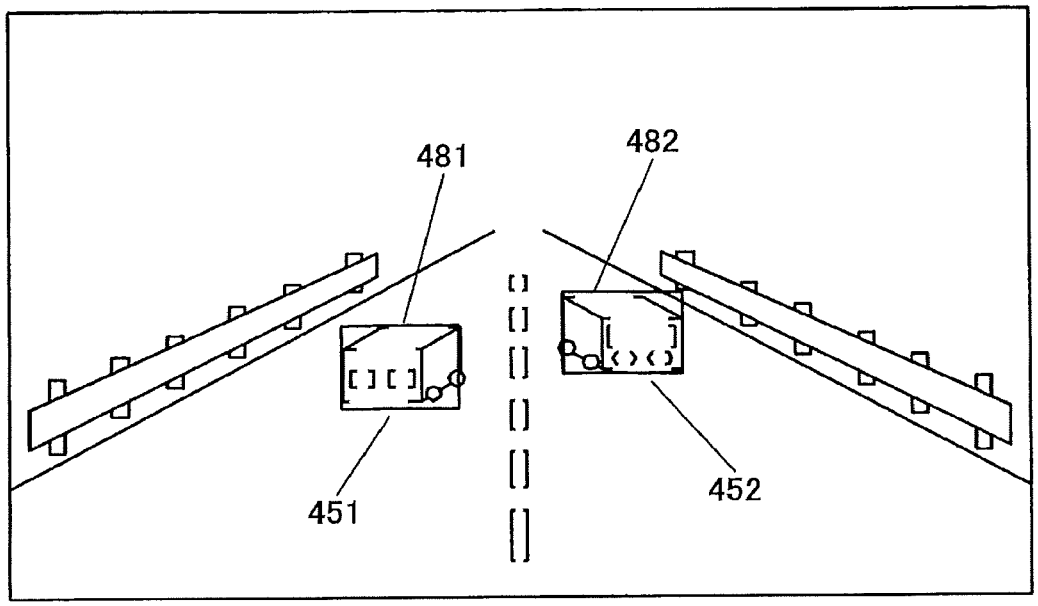
FIG. 30 is a diagram illustrating a parallax image in which a scan range corresponding to the rectangular region is set.
Figure 31:
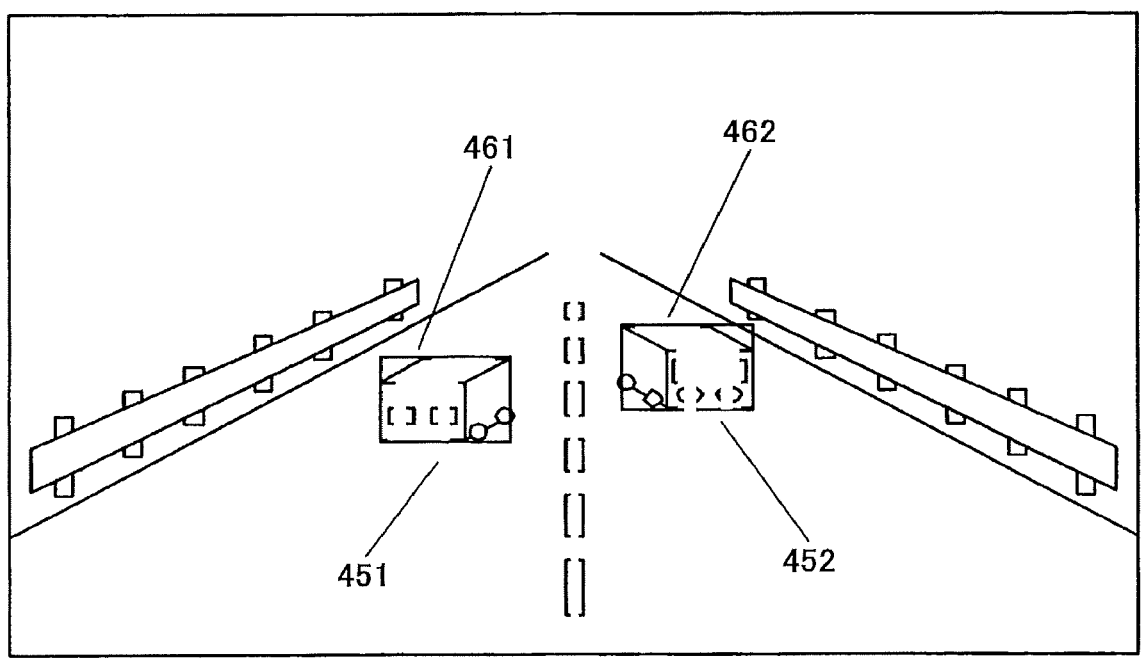
FIG. 31 is a diagram illustrating a parallax image in which an object region is set.

Next, a parallax image correspondence region detecting unit 144 and an object region extracting unit 145 will be described. FIG. 29 is a diagram illustrating a real frequency U map in which a rectangular region inscribed by an isolated region detected by the isolated region detecting unit is set. FIG. 30 is a parallax image in which a scan range corresponding to the rectangular region of FIG. 29 is set. FIG. 31 is a parallax image in which an object region is set by searching for the scan range of FIG. 30.

For example, as illustrated in FIG. 29, the isolated region detecting unit 143 determines a first vehicle 801 and a second vehicle 802 as respective isolated regions, namely as candidate object regions. When a first detection island 811 and a second detection island 812 are set as rectangular regions inscribed by the first vehicle 801 and the second vehicle 802 that are the isolated regions, widths (lengths in the X-axis direction of the U map) of the rectangular regions are equivalent to widths of the respective objects corresponding to the isolated regions. Also, heights of the rectangular regions are equivalent to depths (lengths in the moving direction of the vehicle) of the respective objects corresponding to the isolated regions. At this point, heights of the respective objects corresponding to the isolated regions are unknown. In order to obtain the heights of the respective objects corresponding to the isolated regions (namely, the candidate object regions), the parallax image correspondence region detecting unit 144 detects regions corresponding to the isolated regions of the parallax image.

Based on information of the isolated regions output from the isolated region detecting unit 143 and also based on the positions, widths, and the minimum parallax of the first detection island 811 and the second detection island 812 detected from the real U map, the parallax image correspondence region detecting unit 144 determines, as an x-axis direction range (xmin, xmax), a scan range of a region corresponding to a first detection island 481 and a scan range of a region corresponding to a second detection island 482. The X-axis direction range (xmin, xmax) determined as the scan range of the region corresponding to the first detection island 481 and as the scan range of the region corresponding to the second detection island 482 is the range that is to be detected in the parallax image illustrated in FIG. 30. Further, the parallax image correspondence region detecting unit 144 determines heights and positions of the objects in the parallax image (from ymin, which is a y coordinate value corresponding to the maximum height from the road surface at the time of the maximum parallax dmax, to ymax, which is a y coordinate value indicating the height of the road surface obtained from the maximum parallax dmax).

Next, in order to detect a correct position of the target object, the set scan range is scanned, and pixels having parallax values within the range of the depth (from the minimum parallax dmin to the maximum parallax dmax) of the rectangle region detected by the isolated region detecting unit 143 are extracted as candidate pixels. Lines of pixels within the set scan range in the horizontal direction of FIG. 30 are referred to as lines, and the number of candidate pixels included in each of the lines is detected. Further, the number of the candidate pixels existing in each of the lines in the horizontal direction of the scan range is calculated. A line exceeding a predetermined value is regarded as a candidate line.

Next, the scanning is performed in the vertical direction. In a case where a density of other object candidate lines existing around an object candidate line currently observed is greater than a predetermined density, the object candidate line currently observed is determined as an object line.

Next, the object region extracting unit 145 searches for an object line in a search area of the parallax image and determines a lowermost end and an uppermost end of the object line. As illustrated in FIG. 31, circumscribed rectangles 461 and 462 of a group of the object lines are determined as object regions 451 and 452 (the first vehicle and the second vehicle) in the parallax image.

Figure 32:
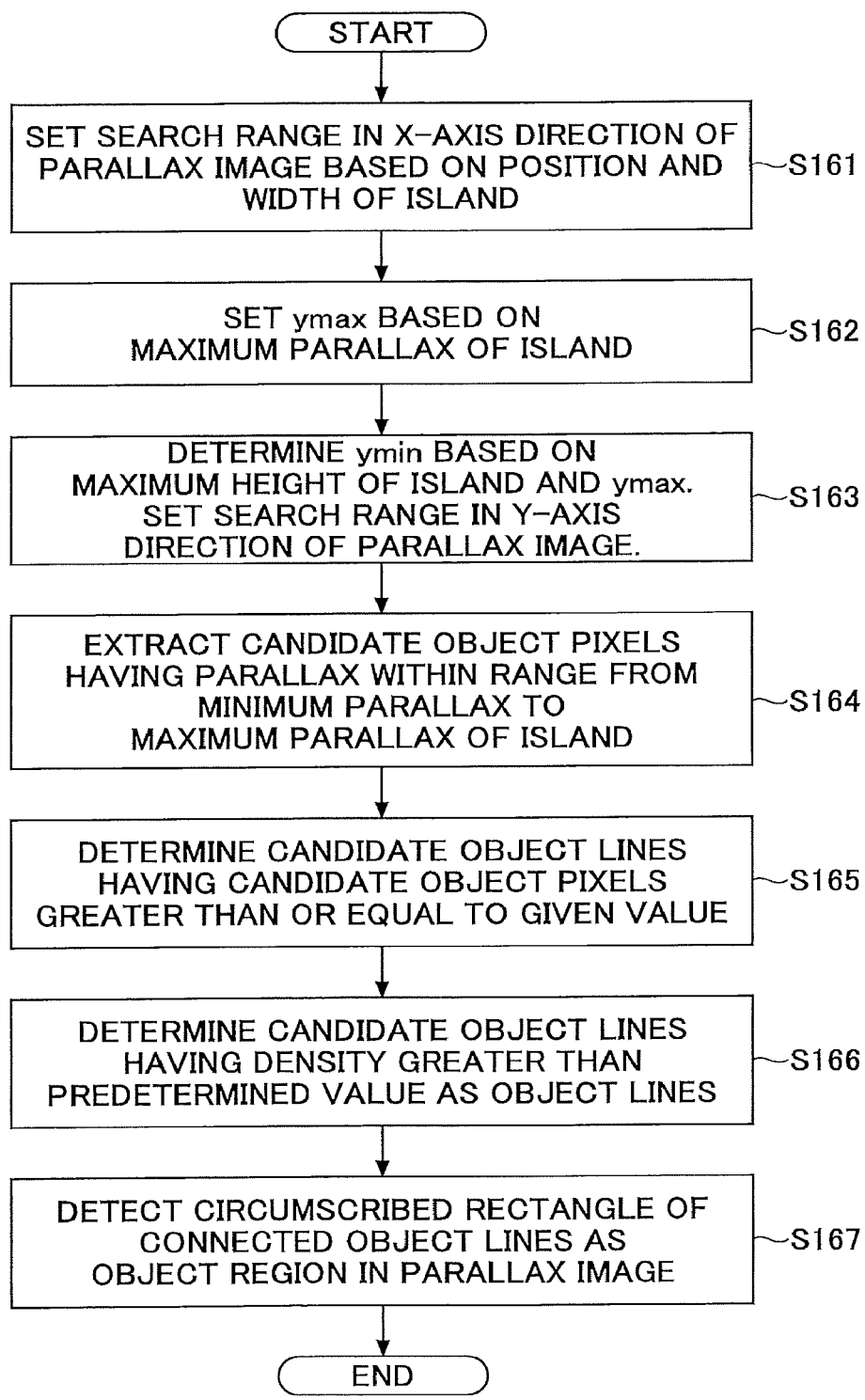
FIG. 32 is a flowchart illustrating a process performed by a parallax image correspondence region detecting unit and an object region extracting unit.

FIG. 32 is a flowchart illustrating a process performed by the parallax image correspondence region detecting unit 144 and the object region extracting unit 145. First, a search range in the x-axis direction of the parallax image is set based on the position, the width, and the minimum parallax of the island in the real U map (step S161).

Next, a maximum search value ymax in the y-axis direction of the parallax image is set based on a relationship between the maximum parallax dmax and the height of the road surface of the island (step S162). Subsequently, based on the maximum height of the island in the real height U map and also based on the ymax and the dmax set in step S172, a minimum search value ymin in the Y-axis direction of the parallax image is calculated and set. Accordingly, a search range in the y-axis direction of the parallax image is set (step S163).

Next, by searching the parallax image in the set search range, pixels within the range from the minimum parallax drain to the maximum parallax dmax of the island are extracted. The extracted pixels are used as candidate object pixels (step S164). When the number of the candidate object pixels exiting on a line in the horizontal direction is greater than or equal to a given value, the line is extracted as a candidate object line (step S165).

A density of the candidate object lines is calculated. If the calculated density is greater than a predetermined value, the candidate object lines can be determined as object lines (step S166). Subsequently, a circumscribed rectangle of the group of the object lines is detected as an object region in the disparity image (step S167).

In this way, an object can be identified.

<<Classification of Object Type>>

Next, an object type classification unit 146 will be described.

Based on the height of the object region (yomax−yomin) extracted by the object region extracting unit 145, an actual height Ho of the object corresponding to the object region can be calculated by the following formula (3)

$$Ho = zo \times (yo\ max - yo\ min)/f \qquad (3)$$

In the formula, zo is a distance between the vehicle and the object corresponding to the object region and is calculated from the minimum parallax value d of the object region, and f is a value obtained by converting a focal distance of the camera into the same unit as that of the (yomax−yomin).

Similarly, based on the width of the object region (xomax−xomin) extracted by the object region extracting unit 145, an actual width Wo of the object corresponding to the object region can be calculated by the following formula (4).

$$Wo = zo \times (xo\ max - xo\ min)/f \qquad (4)$$

Further, based on the maximum parallax "dmax" and the minimum parallax "dmin" in the isolated region corresponding to the object region, a depth Do of the object corresponding to the object region can be calculated by the following formula (5).

$$Do = BF \times \{1/(d\ min - offset) - 1/(d\ max - offset)\} \qquad (5)$$

Based on the height, width, and depth information of the object corresponding to the object region calculated by object type classification unit 146 as described above, the object type classification unit 146 classifies an object type. FIG. 33 is an example of a table for object type classification. According to the table, types of objects such as pedestrians, bicycles, small-sized vehicles, and trucks existing ahead of the vehicle can be separately identified.

<<Determination of Three-Dimensional Position>>

Next, a three-dimensional position determining unit 147 will be described. A distance to the object corresponding to the detected object region can be calculated. Also, a distance on the image between the center of the parallax image and the center of the object region in the parallax image can also be identified. Accordingly, a three-dimensional position of the object can be determined.

It is assumed that the center coordinates of the object region in the parallax image are set to (region_centerX, region_centerY) and the center coordinates of the parallax image are set to (image_centerX, image_centerY). A relative position in the lateral direction and a relative position in the height direction of the object with respect to the imaging units 110a and 110b are calculated by the following formulas (6) and (7).

$$Xo = Z \times (region\_centerX - image\_centerX)/f \qquad (6)$$

$$Yo = Z \times (region\_centerY - image\_centerY)/f \qquad (7)$$

<<Object Matching>>

Next, the object matching unit 148 will be described. The object matching unit 148 compares each object region detected from a given captured frame with a list of objects included in the object data list 135 whose reliability flags S indicate zero (S=0) and are not being tracked, and determines whether the object region matches any object in the list. The matched object region is classified into "Matched" indicating that the object region is the same as the object (the previously detected object, for example, the previously captured frame) in the object data list 135. Conversely, the object region that does not match any object in the object data list 135 is classified into "NewObject" as a newly detected object. Information related to the object region classified into "NewObject" is newly added to the object data list 135.

After the comparison and matching, an object in the object data list 135 that does match is classified into "Missing". When the object is classified into "Missing," the number of undetected frames increases. When the object reaches a predetermined number of undetected frames, the object is erased from the object data list 135.

Second Embodiment

In the first embodiment, the example has been described in which a height of a road surface is preliminarily calculated, and the process of generating a V map and the process of generating a U map based on the height of the road surface are performed simultaneously.

In the second embodiment, a V map is generated based on pixel values of a predetermined area of a parallax image, a height of a road surface is calculated based on the V map, and a U map is generated based on the height of the road surface.

The functional block diagram used for an object detection process according to the second embodiment is the same as the functional block diagram of FIG. 4 according to the first embodiment.

<<Process of Generating Frequency Distribution Image of Parallax Values>>

Next, a process of generating a frequency distribution image of parallax values according to the second embodiment will be described.

The V map generating unit 138 according to the second embodiment generates a V map of a first area and a V map of a second area based on pixel values of the first area (an area lower than the center of the parallax image and nearer to a vehicle) and the second area (an area other than the first area) extracted by the parallax pixel data extracting unit 137.

The road surface profile detecting unit 139 according to the second embodiment and the road surface height table calculating unit 140 according to the second embodiment detect a road surface profile and calculate a height of the road surface based on the V map of the first area generated by the V map generating unit 138 before generation of the V map of the second area is completed by the V map generating unit 138. In the first embodiment, the example has been described in which the road surface profile detecting unit 139 divides a V map into two or more sections according to parallax values, and the linear approximation is performed for each of the sections separately. According to the second embodiment, because the V map of the first area has relatively small parallax values, the road surface profile detecting unit 139 may be configured to perform approximation by using one straight line without dividing the V map into sections.

The U map generating unit 141 according to the second embodiment generates a U map of the first area and a U map of the second area based on pixel values of the first area and the second area extracted by the parallax pixel data extracting unit 137 and also based on the height of the road surface calculated by the road surface height table calculating unit 140.

The U map generating unit 141 according to the second embodiment outputs the U map of the first area to the real U map generating unit 142 upon generating the U map of the first area, and also outputs the U map of the second area to the real U map generating unit 142 upon generating the U map of the second area. Subsequently, the object region extracting unit 145, the object matching unit 148, and the object tracking unit 133 perform processing such as identifying an object based on the U map of the first area before generation of the entire U map for a single frame of the parallax image is completed. Therefore, an object in the first area that is nearer to the vehicle and thus has relatively higher detection priority can be detected at a higher speed.

Figure 34:
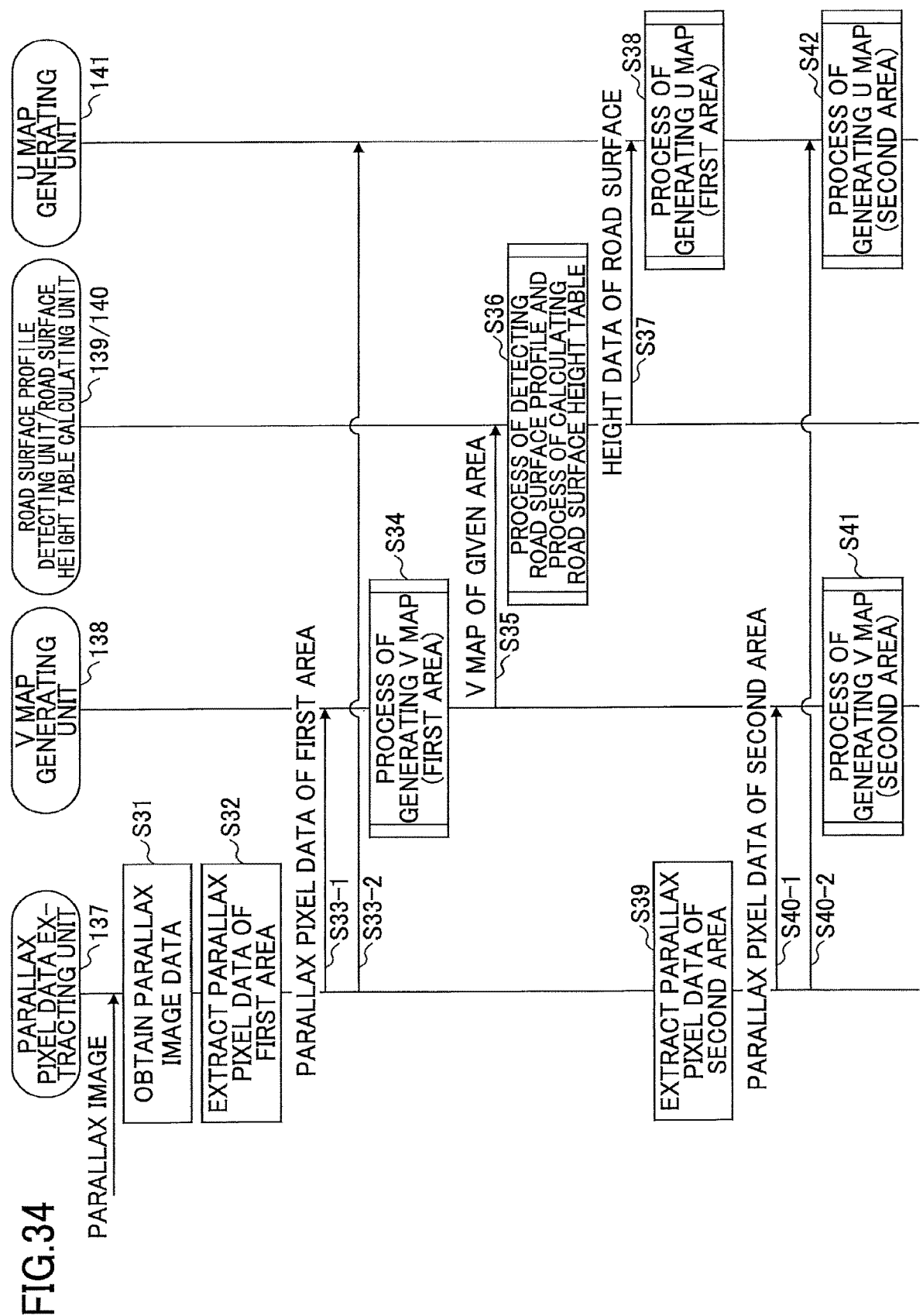
FIG. 34 is a sequence diagram illustrating an example of a process of generating a frequency distribution image of parallax values according to a second embodiment.

Next, referring to FIG. 34, an example of the process of generating a frequency distribution image of parallax values will be described in detail. FIG. 34 is a sequence diagram illustrating the example of the process of generating a frequency distribution image of parallax values according to the second embodiment.

The parallax pixel data extracting unit 137 obtains parallax image data (step S31).

The parallax pixel data extracting unit 137 extracts pixel values from the first area (step S32).

The parallax pixel data extracting unit 137 outputs the extracted pixel values to the V map generating unit 138 and the U map generating unit 141 (steps S33-1 and S33-2).

The V map generating unit 138 generates a V map of the first area based on the extracted pixel values (step S34).

The road surface profile detecting unit 139 and the road surface height table calculating unit 140 obtain the generated V map (step S35), and calculate a height of a road surface based on the generated V map (step S36).

The U map generating unit 141 obtains the calculated height of the road surface (step S37), and generates a U map of the first area based on the height of the road surface and also based on the extracted pixel values (step S38).

The parallax pixel data extracting unit 137 extracts pixel values from the second area (step S39).

The parallax pixel data extracting unit 137 outputs the extracted pixel values to the V map generating unit 138 and the U map generating unit 141 (steps S40-1 and S40-2).

The V map generating unit 138 generates a V map of the second area based on the extracted pixel values (step S41).

The U map generating unit 141 generates a U map of the second area based on the height of the road surface calculated from the V map of the first area in step S36 and also based on the extracted pixel values (step S42).

In the above-described example, the parallax image is divided into the first area and the second area. However, the first area and the second area may be divided into smaller areas and the smaller areas may be processed separately.

In the second embodiment, the process of generating the V map and the process of generating the U map of the second area of the parallax image data are performed simultaneously. Accordingly, an effect similar to that of the first embodiment can be exhibited.

According to at least one embodiment, image processing for detecting an object by using a range image can be performed at a high speed.

It is to be understood that the system configurations of the above-described embodiments are exemplary, and various system configuration examples may be provided according to the application and purpose.

For example, the functional parts of the processing hardware 120 and the image analysis unit 102 may be implemented by hardware, or may be implemented by the CPU executing programs stored in a memory. The programs may be stored in an installable or executable file format on a computer-readable recording medium, and the recording medium storing the programs may be distributed. Further, examples of the recording medium include a compact disc recordable (CD-R), a digital versatile disc (DVD), and a Blu-ray disc (BD). Further, the recording medium such as a CD-ROM storing the programs or a hard disk (HD) storing the programs may be provided as a program product domestically or abroad.

Although the present invention has been described with reference to the embodiments, the present invention is not limited to these embodiments. Various variations and modifications may be made without departing from the scope of the present invention.

What is claimed is:

1. An image processing apparatus, comprising:
    processing circuitry configured to:
       obtain a range image having pixel values corresponding to a distance of an object, in a plurality of captured images obtained by capturing the object on a road surface, so as to
          extract pixel values from a first area of the range image at a first rate, the first area being at least one of an area indicating the road surface in the range image, and an area having a large distance value of the object in the range image, and
          extract pixel values from a second area of the range image at a second rate lower than the first rate;
       generate vertical direction distribution data indicating a frequency distribution of distance values in a vertical direction of the range image based on the extracted pixel values;
       calculate a height of the road surface in the range image before generation of the vertical direction distribution data of the range image is completed; and
       generate horizontal direction distribution data indicating a frequency distribution of distance values in a horizontal direction of the range image based on the extracted pixel values and the calculated height of the road surface.

2. The image processing apparatus according to claim 1, wherein the processing circuitry is configured to calculate a height of the road surface based on vertical direction distribution data generated from a range image that has been obtained at a last time by the processing circuitry.

3. The image processing apparatus according to claim 1, wherein the processing circuitry is configured to calculate a height of the road surface based on a plurality of pieces of vertical direction distribution data generated from a plurality of respective range images that have been previously obtained by the processing circuitry.

4. The image processing apparatus according to claim 1, wherein the processing circuitry is configured to
    generate vertical direction distribution data of the first area, and subsequently generate vertical direction distribution data of the second area, and
    calculate a height of the road surface based on the vertical direction distribution data of the first area before generation of the vertical direction distribution data of the second area is completed.

5. The image processing apparatus according to claim 4, wherein the processing circuitry is configured to
    generate horizontal direction distribution data of the first area, and subsequently generate horizontal direction distribution data of the second area, and
    identify the object based on the horizontal direction distribution data of the first area, and subsequently identify the object based on the horizontal direction distribution data of the second area.

6. An imaging apparatus, comprising:

a plurality of imaging circuits;

a range image generating circuit configured to generate, based on a plurality of captured images of an object on a road surface captured by the plurality of imaging circuits, a range image having pixel values corresponding to a distance of the object in the plurality of captured images; and processing circuitry configured to:
- extract pixel values from a first area of the range image at a first rate, the first area being at least one of an area indicating the road surface in the range image, and an area having a large distance value of the object in the range image;
- extract pixel values from a second area of the range image at a second rate lower than the first rate;
- generate vertical direction distribution data indicating a frequency distribution of distance values in a vertical direction of the range image based on the extracted pixel values;
- calculate a height of the road surface in the range image before generation of the vertical direction distribution data of the range image is completed; and
- generate horizontal direction distribution data indicating a frequency distribution of distance values in a horizontal direction of the range image based on the extracted pixel values and the calculated height of the road surface.

7. A moving object device control system, comprising:

a plurality of imaging circuits disposed on a moving object to capture an image ahead of the moving object;

a range image generating circuit configured to generate, based on a plurality of captured images of an object on a road surface captured by the plurality of imaging circuits, a range image having pixel values corresponding to a distance of the object in the plurality of captured images; and processing circuitry configured to:
- extract pixel values from a first area of the range image at a first rate, the first area being at least one of an area indicating the road surface in the range image, and an area having a large distance value of the object in the range image;
- extract pixel values from a second area of the range image at a second rate lower than the first rate;
- generate vertical direction distribution data indicating a frequency distribution of distance values in a vertical direction of the range image based on the extracted pixel values;
- calculate a height of the road surface in the range image before generation of the vertical direction distribution data of the range image is completed;
- generate horizontal direction distribution data indicating a frequency distribution of distance values in a horizontal direction of the range image based on the extracted pixel values and the calculated height of the road surface; and
- control the moving object based on the horizontal direction distribution data.

* * * * *